US007818031B2

(12) United States Patent
Laumen et al.

(10) Patent No.: US 7,818,031 B2
(45) Date of Patent: Oct. 19, 2010

(54) METHOD FOR STORING MMS (MULTIMEDIA MESSAGING SERVICE) RELATED INFORMATION, RELATED METHOD FOR ACCESSING MMS-RELATED INFORMATION, RELATED STORAGE MEDIUM, RELATED APPARATUS AND RELATED SOFTWARE PROGRAMS

(75) Inventors: Josef Laumen, Hildesheim (DE);
Markus Trauberg, Velchede (DE);
Andreas Schmidt, Braunschweig (DE);
Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 1373 days.

(21) Appl. No.: 10/140,423

(22) Filed: May 6, 2002

(65) Prior Publication Data

US 2003/0119552 A1   Jun. 26, 2003

(30) Foreign Application Priority Data

May 4, 2001   (EP)   ................... 01110877

(51) Int. Cl.
*H04B 1/38*   (2006.01)
(52) U.S. Cl. .................... 455/558; 455/412.1; 455/418; 455/466; 455/557
(58) Field of Classification Search .............. 455/412.1, 455/412.2, 414.1, 414.2, 414.3, 414.4, 413
See application file for complete search history.

(56) References Cited

U.S. PATENT DOCUMENTS 6,397,080 B1 *   5/2002   Viktorsson et al. .......... 455/558

| 6,591,116 | B1 * | 7/2003 | Laurila et al. ................ 455/558 |
| 6,947,396 | B1 * | 9/2005 | Salmi ........................... 370/310 |
| 2002/0087656 | A1 * | 7/2002 | Gargiulo et al. ............. 709/217 |
| 2003/0055735 | A1 * | 3/2003 | Cameron et al. .............. 705/26 |
| 2003/0172219 | A1 * | 9/2003 | Yao ............................. 710/305 |
| 2005/0259604 | A1 * | 11/2005 | Salmi ......................... 370/310 |

FOREIGN PATENT DOCUMENTS

EP   1 059 822   12/2000

OTHER PUBLICATIONS

3G TS31. 101 V1.0.0 (Oct. 1999), 3GPP; Techinal Specification Group Terminals; UICC-Terminal Interface; Physical and Logical Characterics (3G TS 31.101 Version 1.0.0).*
ETSI TS 131.102 v3.1.0 (Apr. 2000), UMTS; Characteristics of the USIM Application (3G TS 31.102 version 3.1.0 Release 1999).*
XP-002158150 Digital cellular telecommunications system (Phase 2+): Specification of the Subscriber Identity Module-Mobile Equipment (SIM-ME) Interface (GSM 11.11 version 6.2.0 Release 1997).
XP 000337627 The Subscriber Identity Module for the European Digital Cellular System GSM and other Mobile Communication Systems; Oct. 25, 1992.

* cited by examiner

*Primary Examiner*—Patrick N Edouard
*Assistant Examiner*—Dai A Phuong
(74) *Attorney, Agent, or Firm*—King & Spalding L.L.P.

(57) ABSTRACT

A method for storing MMS (Multimedia Messaging Service)-related information, related method for accessing MMS-related information, related storage medium, related apparatus and related software programs, wherein the information is stored on at least one storage medium connected to a mobile communication apparatus which supports MMS services or a device connected to such a mobile communication apparatus, with the at least one storage medium being disconnectable from the apparatus or the device.

41 Claims, 7 Drawing Sheets

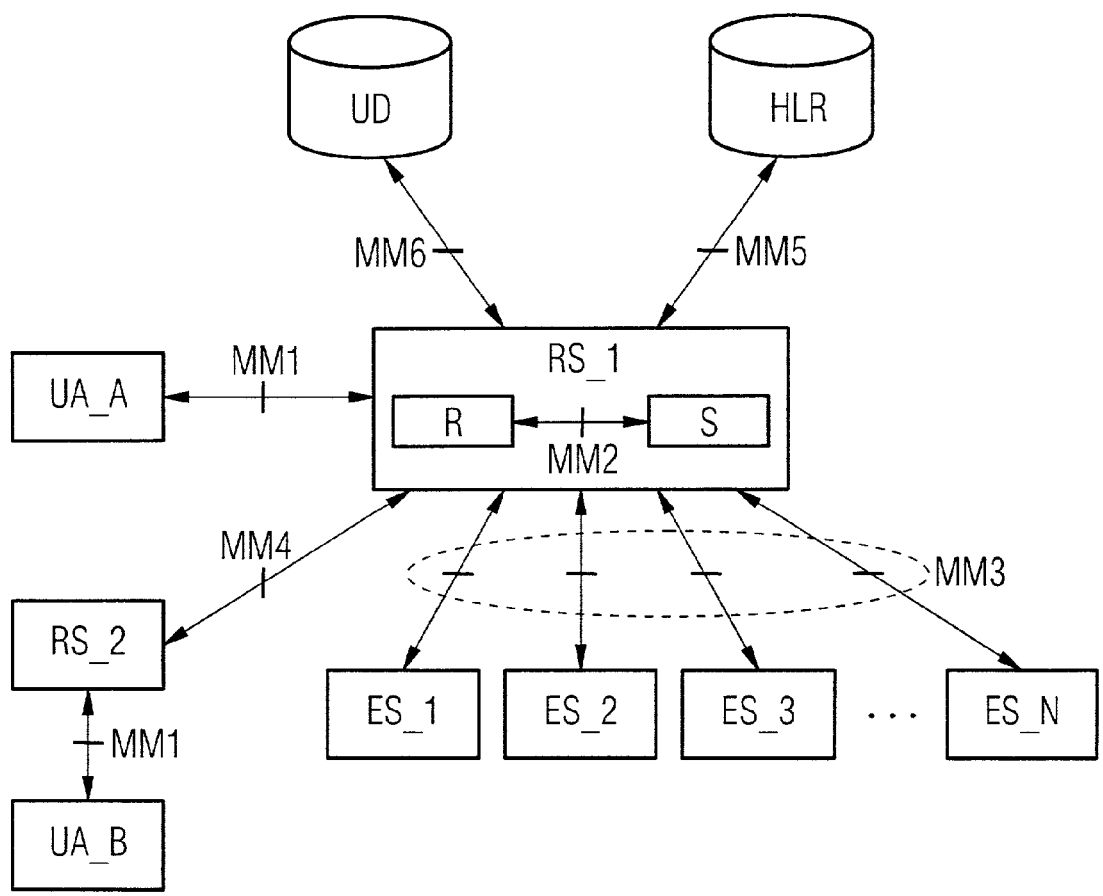
FIG 1 (State of the Art)

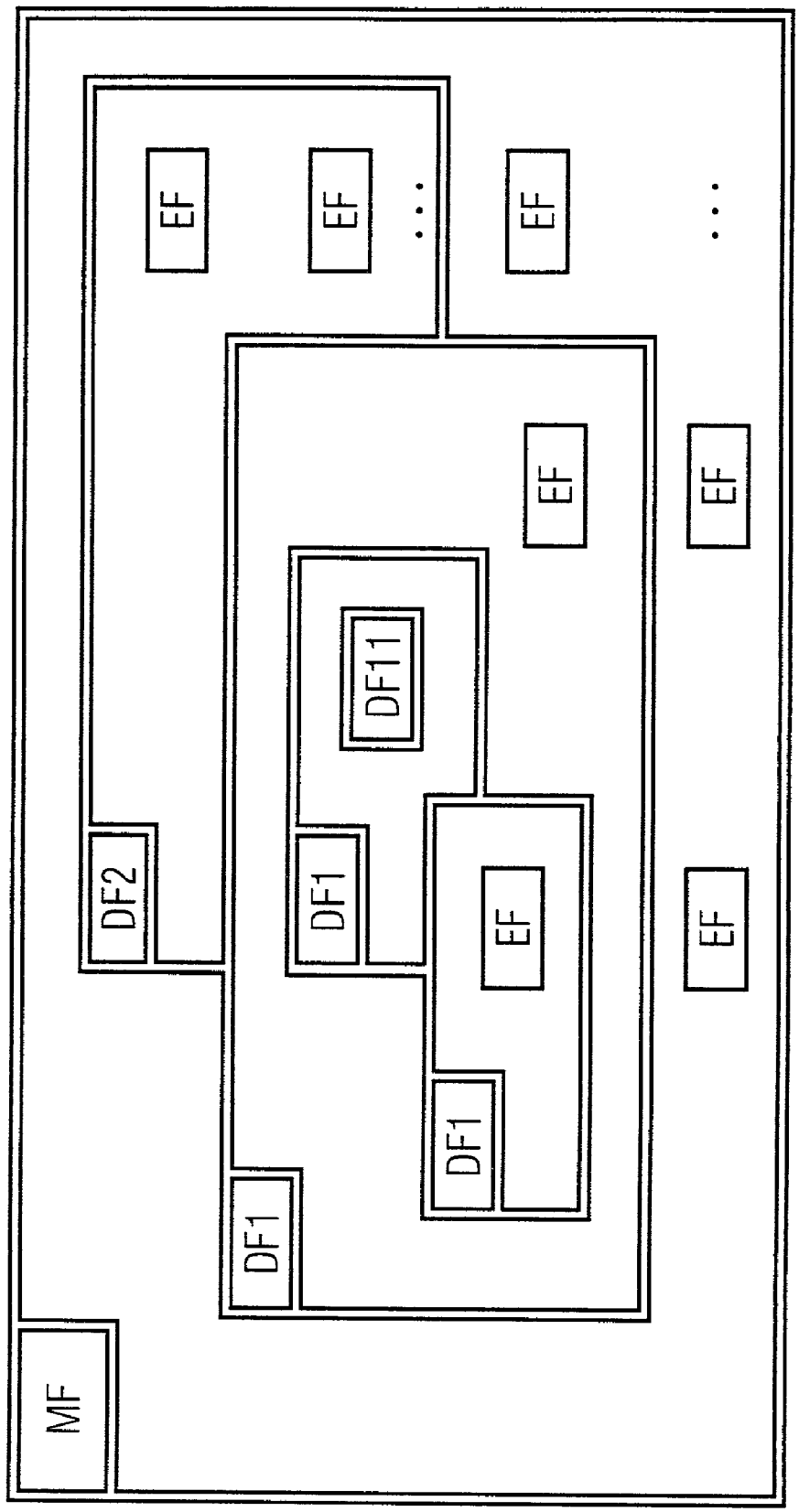
FIG 2 (State of the Art)

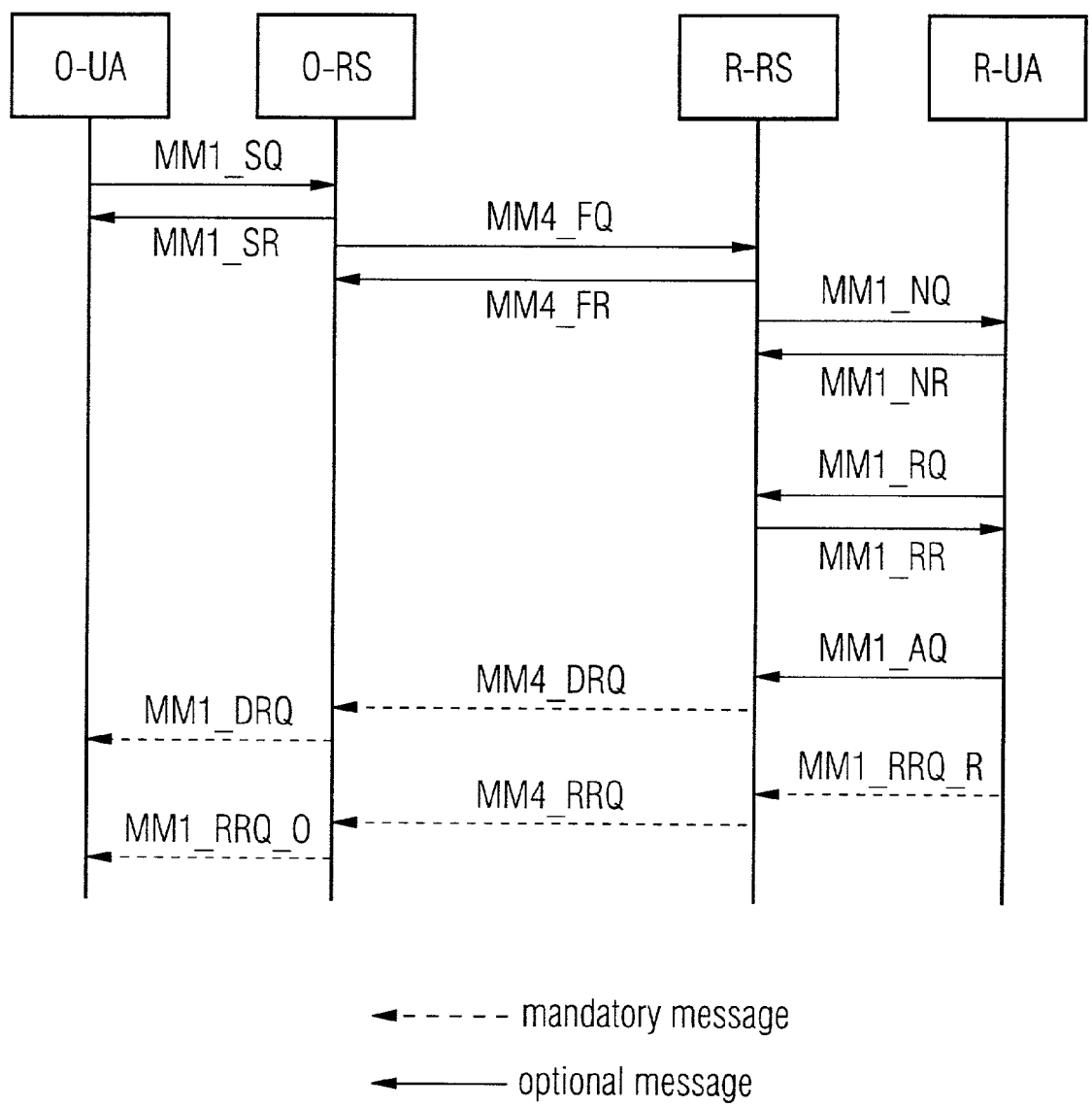

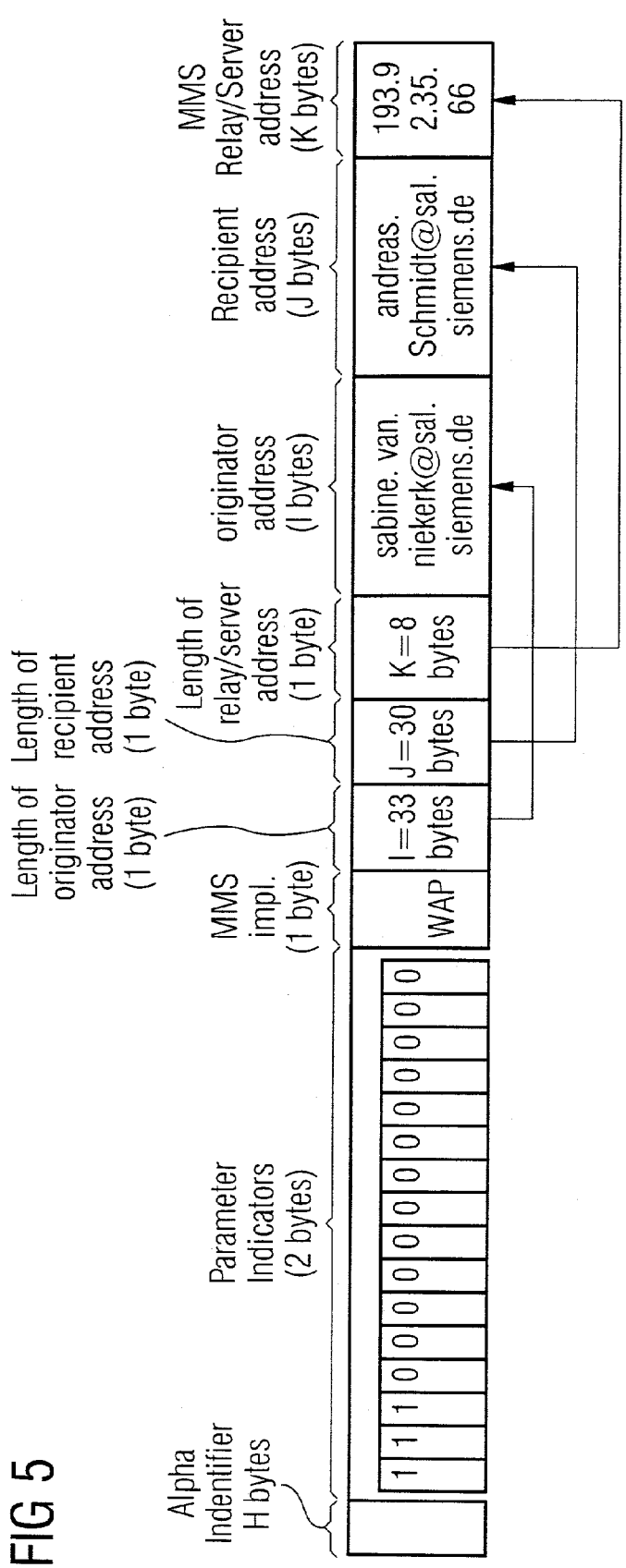

METHOD FOR STORING MMS (MULTIMEDIA MESSAGING SERVICE) RELATED INFORMATION, RELATED METHOD FOR ACCESSING MMS-RELATED INFORMATION, RELATED STORAGE MEDIUM, RELATED APPARATUS AND RELATED SOFTWARE PROGRAMS

BACKGROUND OF THE INVENTION

Currently, a new messaging service, the so-called MMS (Multimedia Messaging Service), is being standardized. Contrary to SMS (Short Message Service), MMS messages can contain multimedia elements such as text, image, audio or video. MMS is planned to be installed in mobile communication systems of the $3^{rd}$ generation such as UMTS (Universal Mobile Telecommunication Service).

MMS as shown in FIG. 1 is a known peer-to-peer messaging service between two MMS User Agents (UA_A, UA_B) which are each connected to an MMS Relay/Server (RS_1, RS_2), each including an MMS Relay (R) and an MMS Server (S) both being connected via an interface called MM2. Both MMS Relay/Server (RS_1, RS_2) are connected via an interface called MM4. Furthermore, each MMS Relay/Server (RS_1, RS_2) can be connected to one or more external servers (ES_1, ..., ES_N) via interfaces called MM3 as well as MMS User Databases (UD) via an interface called MM6 and a Home Location Register via an interface called MM5. The User Agents (UA_A, UA_B) reside on a mobile phone, such as a UMTS-UA (User Equipment) or a GSM-MS (Mobile Station), or on an external device, such as a notebook/laptop, connected to a mobile phone. It is an application layer function that provides the user with the ability to view, compose and handle the Multimedia Messages (MMs); e.g., submitting, receiving, delivering of MMs. The MMS Relay/Server is a network entity responsible for storage and handling of incoming and outgoing messages and for the transfer of the message between different messaging systems.

MMS has much MMS-related information which is necessary for using MMS as messaging service. Important MMS-related information is, for example, the MMS notification, the MMS delivery report, the MMS read reply report, MMS service parameters, the Multimedia Message itself, etc.

A user's MMS-related information is only available on a single terminal/device. If a user changes his/her terminal, all MMS-related information is lost. If, e.g., a user changes his/her terminal before downloading an MM he/she has been notified of this new MM is lost. He/she cannot download it from a terminal different from the one she used when was notified.

It is a goal of the present invention, therefore, to allow users to handle MMS services with more flexibility.

SUMMARY OF THE INVENTION

The present invention proposes to store MMS-related information or parts of MMS-related information on media different from the user's terminal, especially Storage on a SIM (Subscriber Identity Module) or a USIM (UMTS Subscriber Identity Module) on the UICC (Universal Integrated Circuit Card).

Storage on a WIM (Wireless application protocol Identity Module) on the UICC.

Storage on a smart card which is not one of the above, particularly an MMC (Multimedia Card).

It is also proposed to allow a user to have a combination of these storage possibilities. Such a combination can be a SIM and a USIM, or a USIM and a MMC, for example. Likewise, more than two storage mediums can form such a combination.

Furthermore, the present invention:

identifies the information that is useful to be stored on such a repository; and proposes mechanisms how to achieve the storage of MMS-related information and how to access stored MMS-related information on a smart card, in particular on a SIM, a USIM on a UICC, a WIM or a MMC.

The present invention's advantage lies in a much more sophisticated user experience of the MMS service. The present invention allows a user of the MMS service to have consistent access to his/her MMS-related information independent of whatever terminal/device he/she uses at a certain point of time. For example, the user may be notified about an MM (Multimedia Message) coming in but has no time to view or listen to the MM. He/she then may take out the MM stored on the storage medium and plug it into a computer to view or listen to the MM. If the MM contains, for example, a song, the user might listen to it on a music player (adapted to read the format of the song). The user also may extract the MM from another mobile communication apparatus other than the one he/she had in use when notified of the MM. For originating and sending an MM, the user may first compose the MM on a terminal of a mobile communication apparatus or a computer or any suitable apparatus and store the MM on a storage medium. He/she then can remove the storage medium from this apparatus and send it later from another suitable apparatus, the storage medium then being connected to the latter apparatus.

Therefore, the present invention proposes to provide storage possibilities for MMS-related information, preferably on the SIM or on the USIM on the UICC or on any other medium other than the user's terminal/mobile phone at this moment. The present invention also proposes a respective apparatus which stores and/or allows access to such MMS-related information. Such an apparatus is, for example, a mobile communication apparatus, especially a mobile phone (which may include other functionalities; e.g., an organizer). Other embodiments are constituted by external devices, such as a laptop, a notebook or an organizer which are connectable to such a mobile communication apparatus for storing the MMS-related information on the storage medium. The connection between the mobile communication apparatus and the external device may be achieved by a cable, by infrared technology or by any other way of communication.

The storage medium according to the present invention may also be employed by an external apparatus according to the present invention which may be designed to process the MMS-related information or parts thereof. This can be, for example, a music player adapted to read out an acoustical MM which has been received by a mobile phone and stored on the storage medium. The storage medium than can be removed from the mobile phone and put into the music player to play the MM. Here, there is no need for a direct connection between the mobile phone and the music player. Another example for an apparatus according to the present invention is a video player which may read out a video-MM from the storage medium. All the apparatuses for processing MMs (composing and/or displaying) may also be incorporated into a mobile communication apparatus.

MMS has much MMS-related information which is necessary for using MMS as messaging service. Important MMS-related information is, for example, the MMS notification, the MMS delivery report, the MMS read reply report, MMS service parameters, the Multimedia Message itself, etc.

This are some of the MMS-related information which might be stored on the storage medium.

Up to now, it only has been known to store information which is related to SMS (like a short message itself, short message parameters, short message status report, etc.) on SIM-cards. It is known for mobile communication systems of the 3$^{rd}$ generation such as UMTS that the SMS-related information shall be stored on the USIM (the logical functionality) of the UICC (the physical card). In general, the above-mentioned smart cards are plugged into a mobile phone and enable a user to use the mobile communication service he/she has subscribed to. Moreover, user preferences and settings as well as user's personal information can be stored on such smart cards.

For the storage of much information, including the SMS-related information, the memory of the SIM-card is organized in a known hierarchical file structure as shown in FIG. 2. There are three file types; namely, a master file, dedicated files and elementary files. These files may be either administrative or application specific. The operating system handles the access to the data stored in different files. In case of SMS, the SMS related information is stored in several elementary files. In FIG. 3, the known storage of SMS related information on a USIM is shown. Four elementary files on the USIM are dedicated to SMS-related information. These are $EF_{SMS}$ for the storage of short messages, $EF_{SMSS}$ for SMS status information, $EF_{SMSR}$ for SMS reports and $EF_{SMSP}$ where SMS parameters are stored. In a very similar manner SMS-related information is stored on the USIM/UICC.

Additional features and advantages of the present invention are described in, and will be apparent from, the following Detailed Description of the Invention and the Figures.

BRIEF DESCRIPTION OF THE FIGURES

FIG. 1 shows an MMS reference architecture according to the prior art.

FIG. 2 shows organization of memory on a SIM according to the prior art.

FIG. 4 shows an example of MMS transaction flows according to the prior art.

FIG. 5 shows an example of an elementary file ($EF_{MMSP}$).

FIG. 6 shows the parameter indicators of the file according to FIG. 5.

DETAILED DESCRIPTION OF THE INVENTION

Figure 3A:
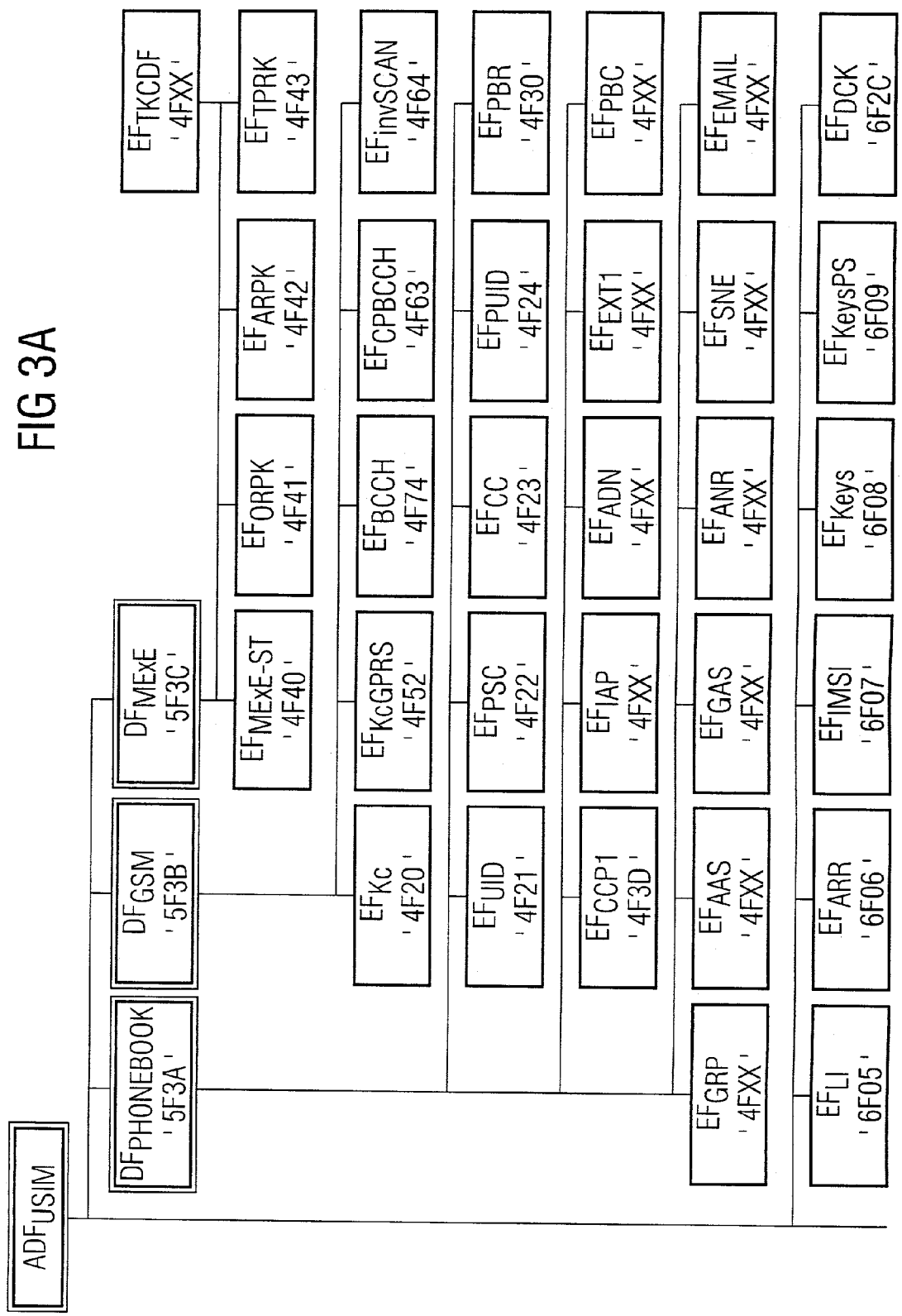
FIG. 3 shows storage of SMS-related information on a USIM according to the prior art.
Figure 3B:
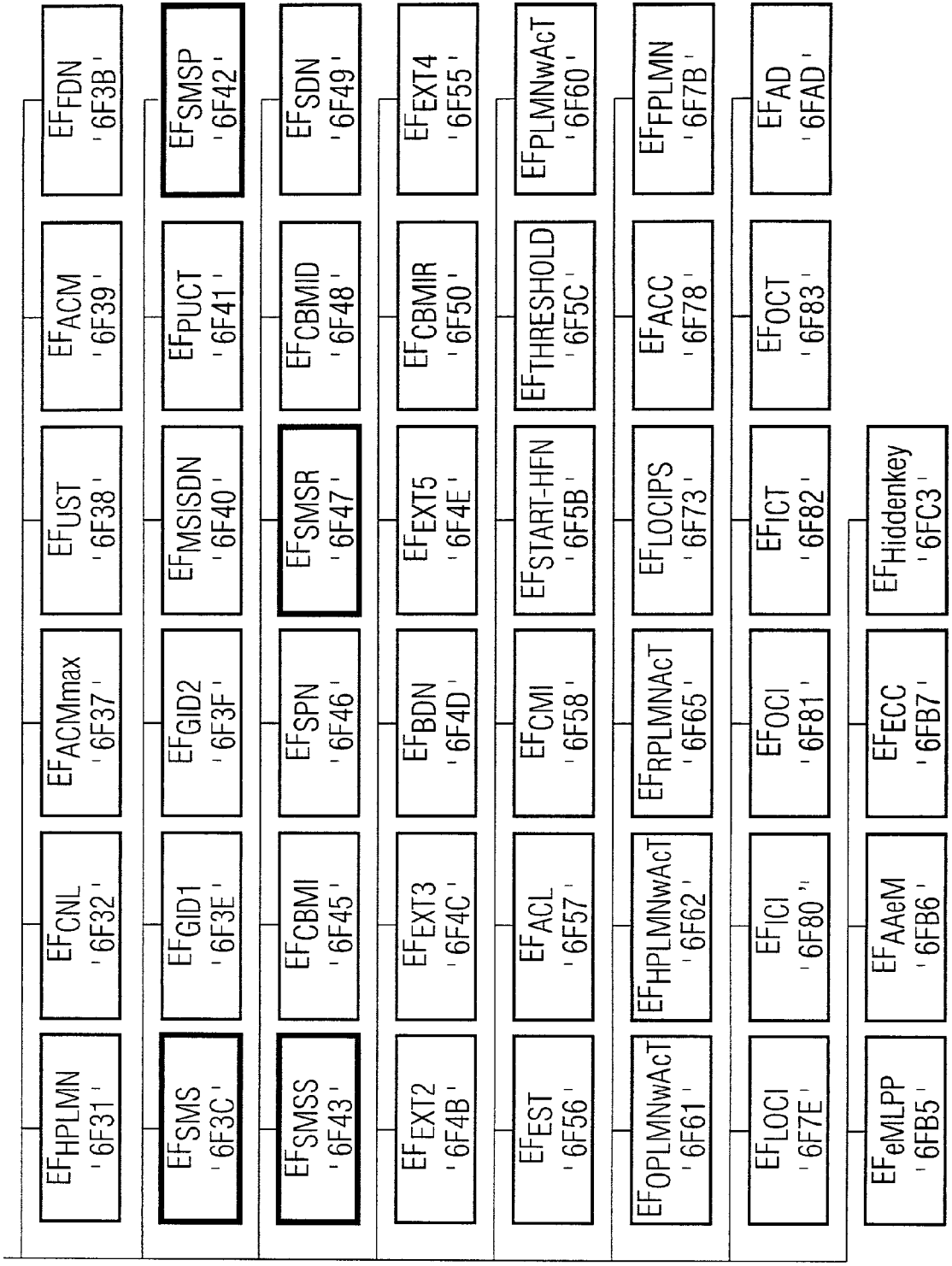

In order to describe the MMS-related information that is referred to throughout this document, the MMS service is roughly explained. FIG. 4 shows a known example of transaction flows of sending an MM from one User Agent (O_UA) to another User Agent (R_UA). The originator MMS User Agent (O-UA) would send an MM by submitting it to the originator MMS Relay/Server (O-RS) using the message MM1_send.REQ (MM1_SQ). The originator MMS Relay/Server acknowledges the submission with message MM1_send.RES (MM1_SR). The MM will be routed forward by the originator MMS Relay/Server (O-RS) using message MM4_forward.REQ (MM4_FQ) to the recipient MMS Relay/Server (R-RS). The recipient MMS Relay/Server (R-RS) acknowledges this with message MM4_forward.RES (MM4_FR). After this, the recipient MMS Relay/Server (R-RS) sends a notification MM1_notification.REQ (MM1_NQ) to the recipient MMS User Agent (R-UA), which acknowledges with message MM1_notification.RES (MM1_NR). With this notification the recipient MMS Relay/Server (R-RS) informs the recipient MMS User Agent (R-UA) about a new MM.

An example of an MMS notification can be as follows:

X-Mms-Message-Type: m-send-request

X-Mms-Transaction-ID: 10

X-Mms-MMS-Version: 1.0

From: markus.trauberg@sal.siemens.de

Subject: A multimedia message

X-Mms-Message-Class: Personal

X-Mms-Message-Size: 52000

X-Mms-Expiry: 36000

X-Mms-Content-Location: http://siemens.de/sal/mms-id

In hexadecimal code after binary encoding according to WAP-209-MMSEncapsulation (WAP-209-MMSEncapsulation, Version 17):

TABLE 1

Example of an MMS notification in hexadecimal code after binary encoding.

0C 80 17 31 30 0D 20 09 20 10 6D 61 72 6B 75 73 2E 74 72 61
75 62 65 72 67 40 73 61 6C 2E 63 69 65 6D 65 6E 73 2E 64 65
00 15 41 20 6D 75 6C 74 69 6D 65 64 69 61 20 6D 65 73 73 61
67 65 00 0A 80 0E CB 20 08 04 81 02 8C A0 03 68 74 74 70 3A
2F 2F 73 69 65 6D 65 6E 73 2E 64 65 2F 73 61 6C 2F 6D 6D 73
2D 69 64

To retrieve the MM, the recipient MMS User Agent (R-UA) requests this MM from the recipient MMS Relay/Server (R-RS). This recipient MMS Relay/Server responds with message MM1_retrieve.REQ (MM1_RQ). In a response to this request the recipient MMS Relay/Server (R-RS) delivers the MM to the recipient MMS User Agent with message MM1_retrieve.RES (MM1_RR). The recipient User Agent (R-UA) acknowledges the successful reception of the MM by sending a message MM1_acknowledge.REQ (MM1_AQ) to the recipient MMS Relay/Server (R-RS). The recipient MMS Relay/Server (R-RS) may create a delivery report and send it with message MM4_delivery_report.REQ (MM4_DRQ) to the originator MMS Relay/Server (O-RS). The originator MMS Relay/Server conveys this delivery report to the originator User Agent (O-UA) with message MM1_delivery_report (MM1_DRQ). In addition, for example, after rendering the MM to the user, the recipient User Agent (R-UA) may send a read-reply report with message MM1_read reply_recipient.REQ (MM1_RRQ_R) to the recipient MMS Relay/Server (R-RS). The recipient MMS Relay/Server (R-RS) routes the read-reply report with message MM4_read_reply_report.REQ (MM4_RRQ) forward to the originator MMS Relay/Server (O-RS) which conveys it further to the originator MMS User Agent with message MM1_read_reply_originator.REQ (MM1_RRQ_O).

According to one preferred embodiment of the present invention, MMS-related information can be stored on one or more smart cards. Plugged into a mobile phone, these smart cards enable a user to use the MMS service he/she has subscribed to. User preferences for the MMS service and settings as well as the user's personal information can be stored on such smart cards.

One preferred possibility according to the present invention is storing and/or accessing the MMS-related information on a general smart card (i.e., other than WIM, SIM or USIM on an UICC) which can be plugged into a terminal. Such a smart card is preferably a multimedia card (MMC). The advantage of this is that the data is available to a user in a consistent manner independent of the terminal he/she uses. Another advantage is that, in general, an MMC offers much more storage capacities than a WIM, SIM or a USIM/UICC. An MMC even allows for the storage of several entire Multimedia Messages (which can exceed many kilobytes, even megabytes of data each).

Another preferred embodiment of the present invention, which already has been mentioned above, is the storage on the SIM or on the USIM of the UICC or on a combination of storage on the SIM/USIM on the UICC and the terminal. The MMS-related information can be stored in several files; e.g., elementary files (EFs), dedicated files (DFs) or master file (MF) on the SIM card or on the USIM application of a UICC card, which by definition can be plugged into a mobile phone (note, that the MMS-related information in EFs and/or DFs and/or the MF advantageously also can be stored/accessed in other storage media according to the present invention). The advantage of this proposal is that the information is available to a user in a consistent manner independent of the terminal he/she uses. Another advantage is that a SIM or a UICC is always available in every single GSM or UMTS phone. That is, this preferred embodiment ensures that the file format used for the MMS information and the mechanisms to access this information are understood by every single MMS-capable GSM or UMTS phone independent of the terminal's manufacturer for the file formats and access conditions are standardized for the SIM and the USIM/UICC. This is the reason why this proposal is one preferred solution.

Storing of the MMS related data in several EFs preferably can be done in three different ways according to the present invention. In the following, the storage on the USIM on the UICC is described. Note that the mechanisms for storing and accessing MMS-relevant information on a SIM, on a Multimedia Card or on any other type of smart card preferably are identical to the mechanisms on the USIM. The following three different cases will be discussed:

I. Storage of MMS-related information in several (elementary) files.
II. Storage of MMS-related information in one universal/generic (elementary) file.
II. Storage of the MMS notification in the existing (elementary) file $EF_{SMS}$.

These different storage principles will now be discussed in more detail.

I. Storage of MMS-Related Information in Several Files

The first preferred embodiment proposed for the storage of MMS-related information is the storage in several files. For every important piece of MMS information, it is proposed to have a separate elementary file. In this example, seven new elementary files are described. These files are (the names are chosen only by way of example):

a) $EF_{MMSN}$: Elementary file for the MMS notification.
b) $EF_{MM}$: Elementary file for the Multimedia Message.
c) $EF_{MMSS}$: Elementary file for the MMS status.
d) $EF_{MMSP}$: Elementary file for the MMS parameters.
e) $EF_{MMSDR}$: Elementary file for the MMS delivery report.
f) $EF_{MMSRR}$: Elementary file for the MMS read reply report.
g) $EF_{MMSL}$: Elementary file for the MMS size limitations.

Furthermore, changes are proposed to the USIM service table ($EF_{UST}$) which allows the USIM to indicate available services.

a) $EF_{MMSN}$ (MMS Notification)

This EF preferably includes information in accordance with 3G TS 23.140 (3GPP TS 23.140 V4.2.0 (Release 4), Multimedia Messaging Service (MMS); Functional description; stage 2) and WAP-209-MMSEncapsulation including MMS notifications (and associated parameters) which have been received by the UA from the MMS Relay/Server. With an MMS notification, the MMS Relay/Server informs the UA of a recipient user about the arrival of a new MM. In particular, the notification contains the information where the user can find that MM for downloading it from the network. Based on this information, the recipient is able to retrieve the MM from the MMS Relay/Server at a later point in time.

Moreover, in case the sender has requested to get feedback information on the status of delivery for that MM (delivery report), the notification may contain information about this request. Based on this information in the notification, the recipient user may decide to allow or disallow the MMS Relay/Server to create such a delivery report.

The advantage of storing the MMS notification on the (U)SIM (or any other storage medium according to the present invention) is that the user has consistent access to received MMS notifications and their status independent of whatever terminal/device he/she uses at a certain point of time.

Table 2 shows the preferred structure of every single record (an entry) of the elementary file.

TABLE 2

| EF for MMS Notification | | | |
|---|---|---|---|
| Identifier: "6FD0" | | Structure: Linear fixed | Optional |
| Record length: 1+A bytes | | Update activity: low | |
| Access Conditions: | | | |
| READ | PIN | | |
| UPDATE | PIN | | |
| DEACTIVATE | ADM | | |
| ACTIVATE | ADM | | |
| Bytes | Description | M/O | Length |
| 1 | Status | M | 1 byte |
| 2 to A+1 | MMS Notification | M | A bytes |

According to the present invention this EF has the following preferred structure:

Assigned to every EF is an "identifier" which addresses a file in the USIM and is 2 bytes long. All the service and network related information includes addresses beginning with "6F . . . ". Because of this, the address for this EF with MMS-related information is chosen to be an address beginning with "6F. . . ". The "structure" of the file refers to which file structure is used. The file can be transparent, linear fixed, linear variable or linear cyclic. In this case, it is chosen to be linear for a sequence of records is needed and fixed. The size of every record (an entry in the elementary file), which is "A+1" octets in the Table 2, has to be the same.

Note: Most of the MMS-related information does not have a well-defined size, but the value of "A" would need to be predefined. Using linear fixed files means that the storage capacity of the elementary file cannot be used in the most efficient way. For notifications that are shorter than "A+1" octets still "A+1" would be reserved (but not used) while notifications that are longer than "A+1" octets would need to be cut off. A second proposal is, thus, to use a linear variable file structure for the EFs. In this case, every record has a variable length, which saves storing capacity. From a technical point of view, a linear variable file structure is preferred. However, both SIM and USIM only support linear fixed file structures. Thus, the present invention prefers the first solution. For records that are not completely filled with MMS-related data, subsequent octets following the MMS-related data shall be filled with "FF". This note applies also to all other elementary files further down.

The $EF_{MMSN}$ can be optional or mandatory. In this case, it is chosen to be "optional", because MMS will be an optional feature on 3G mobile phones. The next parameter is the "record length", which contains the total file length in bytes. The "update activity" can be low or high. In this file the update activity is low, because this EF preferably will not be updated as often as, for example, the keys on the USIM. The file has the following access conditions: For "READ" and "UPDATE" preferably "PIN" (Personal Identification Number) is used, as conditions which the user controls. For "DEACTIVATE" and "ACTIVATE" preferably "ADM" is used, because these access conditions are under control of the authority which created this file. That is, the file can be read and updated by the user to whom the SIM grants access by the use of a PIN while it can only be activated and deactivated by the operator of the mobile network. Furthermore, Table 2 indicates which bytes are used for which parameter, a description of the data and the length of the data.

EFs described below will preferably have the same structure.

According to Table 2, the $EF_{MMSN}$ preferably includes one or more of the following data:

1. Status

Preferred contents of "Status": The status byte in the $EF_{MMSN}$ contains information related to the MMS notification. This information can be, for example:

The MMS notification is received by the UA from the MMS Relay/Server, is stored in the $EF_{MMSN}$ on the USIM (or another storage medium according to the present invention; without limitation the following explanation refers to an USIM), but has not been read by the user yet (i.e., MMS Notification to be read).

The MMS notification received by the UA from the MMS Relay/Server is stored in the $EF_{MMSN}$ on the USIM and the notification has been read by the user.

In the case that the MMS notification received by the UA from the MMS Relay/Server is stored in the $EF_{MMSN}$ on the USIM and the notification has been read by the user, there are some possibilities according to delivery report related information:
  A delivery report has not been requested by the sender of the MM which the notification refers to.
  A delivery report has been requested by the sender and in a response to this notification the recipient has permitted the MMS Relay/Server to create this delivery report.
  A delivery report has been requested by the sender and in a response to this notification the recipient has not permitted the MMS Relay/Server to create this delivery report.

In the case that the MMS notification received by the UA from the MMS Relay/Server is stored in the $EF_{MMSN}$ on the USIM and the notification is read by the user there are some possibilities according to MM retrieval related information:
  The MM retrieval has been requested by the recipient, but the MM is not (yet) retrieved.
  The MM has been retrieved from the MMS Relay/Server by the UA.

The status byte of the record can be used as a pattern in the SEARCH RECORD command. The SEARCH RECORD is a function on the interface between the terminal and the USIM which allows the terminal to search for a pattern in various USIM entries. The status preferably will be updated when the UA receives an MMS notification.

Preferred coding of "Status": The preferred coding of the status byte is depicted in Table 3 below.

1 denotes that the corresponding bit is set.
0 means the corresponding bit is NOT set.
X indicates that the corresponding bit may be set or not (i.e., the interpretation of the status byte is independent of this bit's value).

TABLE 3

Preferred coding of the status byte.

| b8 | b7 | b6 | b5 | b4 | b3 | b2 | b1 | |
|----|----|----|----|----|----|----|----|---|
|    |    | X  | X  | X  | X  | X  | 0  | Free space |
|    |    | X  | X  | X  | X  | X  | 1  | Used space |
|    |    | X  | X  | X  | X  | 0  | 1  | MMS notification received by UA from MMS Relay/Server; notification to be read |
|    |    | X  | X  | X  | X  | 1  | 1  | MMS notification received by UA from MMS Relay/Server; notification read |
|    |    | X  | X  | X  | 0  | 1  | 1  | Delivery report related information |
|    |    | X  | X  | 0  | 0  | 1  | 1  | delivery report not requested. |
|    |    | X  | 1  | 1  | 0  | 1  | 1  | delivery report requested and creation of delivery report allowed. |
|    |    | X  | 0  | 1  | 0  | 1  | 1  | delivery report requested, but creation of delivery report not allowed. |
|    |    | X  | X  | X  | 1  | 1  | 1  | MM retrieval related information |
|    |    | X  | X  | 0  | 1  | 1  | 1  | MM retrieval requested but MM not (yet) retrieved |
|    |    | X  | X  | 1  | 1  | 1  | 1  | MM retrieved from the MMS Relay/Server Reserved for future use |

When, for example, the notification, which has been described with respect to FIG. 4, is sent from an originator MMS User Agent to a recipient User Agent, the MMS notification has been received by the recipient User Agent from the recipient MMS Relay/Server, has been read by the user, the creation of a delivery report has been requested by the originator MMS User Agent (and the recipient MMS User Agent has been informed about this request in the notification)

and the creation of this delivery report has been allowed by the recipient User Agent, the status byte will be "XXX1 1011", i.e., for example, "0001 1011" in bit presentation, which is "1B" in hexadecimal presentation. The contents of the EFMMSN in hexadecimal presentation, thus, will be as follows:

TABLE 4

Example of an MMS notification.

1B 0C 80 17 31 30 0D 20 09 20 10 6D 61 72 6B 75 73 2E 74 72 61
75 62 65 72 22 67 40 73 61 6C 2E 63 69 65 6D 65 6E 73 2E 64 65
00 15 41 20 6D 75 6C 74 69 6D 65 64 69 61 20 6D 65 73 73 61
67 65 00 0A 80 0E CB 20 08 04 81 02 8C A0 03 68 74 74 70 3A
2F 2F 73 69 65 6D 65 6E 73 2E 64 65 2F 73 61 6C 2F 6D 6D 73
2D 69 64

The "1B" in this record corresponds to the status byte and the other part of this file is identical to the MMS notification as given in the chapter "state of the art" above.

2. MMS Notification

Preferred contents of "MMS Notification": The A bytes of MMS Notification contain, in particular, the notification information about an MM as it has been received from the MMS Relay/Server.

b) $EF_{MM}$ (Multimedia Message)

This EF preferably includes information in accordance with 3G TS 23.140 and WAP-209-MMSEncapsulation including MMs (and preferably associated parameters) which have either been received by the UA from the MMS Relay/Server or are UA originated messages.

In UA originated messages, the sender has the possibility to request feedback information on the status of delivery for that MM (delivery report) and/or feedback information on the status of handling/rendering that MM on the recipient's UA (read-reply report). After submitting a UA originated MM to the MMS Relay/Server, the UA awaits this feedback information which has to be matched to this MM.

UA terminated messages are always retrieved based on information provided in a prior received notification.

In case the sender of such a UA terminated MM has requested to get feedback information on the status of delivery for that MM (delivery report), the MM contains information about this request. Based on this information in the MM the recipient user may decide to allow or disallow the MMS Relay/Server to create such a delivery report. In case the sender of that MM has requested to get feedback information on the status of handling/rendering that MM on the recipient's UA (read-reply report) the MM contains information about this request. Based on this information in the MM the recipient user may decide to create and send out such a read-reply report.

The advantage of storing the MM on the (U)SIM or a WIM is that the user has consistent access to the MM and its status independent of whatever terminal/device he/she uses at a certain point in time.

Table 5 shows the preferred structure of every single record (an entry) of the elementary file.

TABLE 5

EF for MM.

Identifier: "6FD1"  Structure: Linear fixed  Optional
Record length: 1+B bytes  Update activity: low
Access Conditions:
    READ        PIN
    UPDATE    PIN
    DEACTIVATE  ADM
    ACTIVATE    ADM

| Bytes | Description | M/O | Length |
|---|---|---|---|
| 1 | Status | M | 1 byte |
| 2 to B+1 | MM | M | B bytes |

According to Table 5, the $EF_{MM}$ preferably includes one or more of the following data:

1. Status

Preferred contents of "Status": The status byte of the record advantageously can be used as a pattern in the SEARCH RECORD command. The status preferably will be updated when the UA receives an MM or has originated an MM which is to be stored on a USIM (or a SIM, a WIM, a MMC or another storage medium according to the present invention).

The status byte in the $EF_{MM}$ contains information related to the MM. This information can indicate for example:

In case of UA terminated MM:

The MM has been received by the UA from the MMS Relay/Server and is stored in the $EF_{MM}$ on the USIM (or another storage medium according to the present invention; without limitation the following explanation refers to an USIM), but has not been read by the user yet (i.e., MM to be read).

The MM has been received by the UA from the MMS Relay/Server, has been stored in the $EF_{MM}$ on the USIM and the MM has been read by the user. In the case that the MM received by the UA from the MMS Relay/Server is stored in the $EF_{MM}$ on the USIM and the notification has been read by the user there are some possibilities according to delivery report related information:

A delivery report has not been requested by the sender of the MM.

A delivery report has been requested by the sender and the recipient has permitted the MMS Relay/Server to create this delivery report.

A delivery report has been requested by the sender and the recipient has not permitted the MMS Relay/Server to create this delivery report.

In the case that the MM received by the UA from the MMS Relay/Server is stored in the $EF_{MM}$ on the USIM and the MM is read by the user there are some possibilities according to read-reply report related information:

A read-reply report for the MM has not been requested by the sender.

The read-reply report for the MM has been requested by the sender, but has not yet been created by the recipient.

The read-reply report has been requested for the MM and this read-reply report has been created by the recipient, but has not (yet) been sent out.

The read-reply report has been requested for the MM and this read-reply report has been created by the recipient and has been sent out.

In case of UA originated MM:

An MM has been created by the user, but has not yet been submitted to the MMS Relay/Server.

An MM has been created by the user and has been submitted to the MMS Relay/Server.

In case that the MM has been submitted to the MMS Relay/Server, there are the following possibilities according to the delivery report:

A delivery report has not been requested for the MM.

A delivery report has been requested for the MM, but it has not (yet) been received.

A delivery report has been requested for the MM and this delivery report has been received, but has not (yet) been stored in $EF_{MMSDR}$.

A delivery report has been requested for the MM and this delivery report has been received and is stored in $EF_{MMSDR}$.

In case that the MM has been submitted to the MMS Relay/Server there are the following possibilities according to the read-reply report:

A read-reply has not been requested for the MM.

A read-reply report has been requested for the MM, but has not (yet) been received.

A read-reply report has been requested for the MM and this read-reply report has been received, but has not (yet) been stored in $EF_{MMSRR}$.

A read-reply report has been requested for the MM and this read-reply report has been received and is stored in $EF_{MMSRR}$.

TABLE 6

Preferred coding of the status byte.

Preferred coding of "Status":

| b8 | b7 | B6 | b5 | b4 | b3 | b2 | b1 | |
|---|---|---|---|---|---|---|---|---|
|  |  | X | X | X | X | X | 0 | Free space |
|  |  | X | X | X | X | X | 1 | Used space |
|  |  | X | X | X | X | 0 | 1 | MM received by UA from MMS Relay/Server |
|  |  | X | X | X | 0 | 0 | 1 | MM to be read |
|  |  | X | X | X | 1 | 0 | 1 | MM read |
|  |  | X | X | 0 | 1 | 0 | 1 | Delivery report related information |
|  |  | 0 | 1 | 0 | 1 | 0 | 1 | Delivery report requested for the MM but not allowed to be created |
|  |  | 1 | 0 | 0 | 1 | 0 | 1 | Delivery report requested for the MM and allowed to be created |
|  |  | 1 | 1 | 0 | 1 | 0 | 1 | Reserved for future use |
|  |  | X | X | 1 | 1 | 0 | 1 | Read-Reply report related information |
|  |  | 0 | 0 | 1 | 1 | 0 | 1 | Read-Reply report not requested for the MM |
|  |  | 0 | 1 | 1 | 1 | 0 | 1 | Read-Reply report requested for the MM but not (yet) created |
|  |  | 1 | 0 | 1 | 1 | 0 | 1 | Read-Reply report requested for the MM, created, but not (yet) sent out |
|  |  | 1 | 1 | 1 | 1 | 0 | 1 | Read-Reply report requested for the MM, created and sent out Reserved for future |

| b8 | B7 | B6 | b5 | b4 | b3 | b2 | b1 | |
|---|---|---|---|---|---|---|---|---|
|  |  | X | X | X | X | 1 | 1 | UA originating MM |
|  |  | X | X | X | 0 | 1 | 1 | MM to be submitted to the MMS Relay/Server(draft MM stored on the USIM) |
|  |  | X | X | X | 1 | 1 | 1 | MM submitted to the MMS Relay/Server |
|  |  | X | X | 0 | 1 | 1 | 1 | Delivery report related information |
|  |  | 0 | 0 | 0 | 1 | 1 | 1 | Delivery report not requested for the MM |
|  |  | 0 | 1 | 0 | 1 | 1 | 1 | Delivery report requested for the MM but not (yet) received |
|  |  | 1 | 0 | 0 | 1 | 1 | 1 | Delivery report requested for the MM, received, but not stored in $EF_{MMSDR}$ |
|  |  | 1 | 1 | 0 | 1 | 1 | 1 | Delivery report requested for the MM, received and stored in $EF_{MMSDR}$ |
|  |  | X | X | 1 | 1 | 1 | 1 | Read-Reply report related information |
|  |  | 0 | 0 | 1 | 1 | 1 | 1 | Read-Reply report not requested for the MM |
|  |  | 0 | 1 | 1 | 1 | 1 | 1 | Read-Reply report requested for the MM but not (yet) received |
|  |  | 1 | 0 | 1 | 1 | 1 | 1 | Read-Reply report requested for the MM, received, but not stored in $EF_{MMSRR}$ |
|  |  | 1 | 1 | 1 | 1 | 1 | 1 | Read-Reply report requested for the MM, received and stored in $EF_{MMSRR}$ Reserved for future use |

2. MM

Preferred Contents of "MM": The MM contains the entire multimedia message including MM elements/attachments.

Preferred coding of "MM": The MM is preferably coded according to 3G TS 23.140 and WAP-209-MMSEncapsulation.

c) $EF_{MMSS}$ (MMS Status)

This EF preferably includes status information relating to the multimedia message service. This file can be read by the UA in order to get information about the current memory capacity for the storage of MMS related information on the USIM (or any other storage medium according to the present invention) such as, for example, MMS notification, MM, MMS delivery report, MMS read reply report, etc. This ensures that the maximum memory capacity is not exceeded. This information may be used by the UA to inform the MMS Relay/Server about the current memory capacity on the USIM.

When, for example, a MMS notification is passed from the UA to the USIM, the USIM determines the available memory capacity by calculating the difference between the current memory capacity (which is known to the USIM) and the size of the incoming data.

Table 7 shows the structure of every single record (an entry) of the elementary file.

TABLE 7

EF for MMS status.

Identifier: "6FD2"    Structure: Transparent    Optional
File size: C+D+E+F+G bytes    Update activity: low
Access Conditions:
    READ      PIN
    UPDATE      PIN
    DEACTIVATE      ADM
    ACTIVATE      ADM

| Bytes | Description | M/O | Length |
|---|---|---|---|
| 1 to C | Message-ID | M | C bytes |
| C+1 to C+D | MMS notification memory capacity | M | D bytes |
| C+D+1 to C+D+E | MM memory capacity | M | E bytes |
| C+D+E+1 to C+D+E+F | MMS delivery report memory capacity | M | F bytes |
| C+D+E+F+1 to C+D+E+F+G | MMS read reply report memory capacity | M | G bytes |

According to Table 7, the $EF_{MMSS}$ preferably includes one or more of the following data:

1. Message-ID

Preferred contents of "Message-ID": The message-ID is a unique reference assigned to the MM.

Preferred coding of "Message-ID": The message-ID is coded according to 3G TS 23.140 and WAP-209-MMSEncapsulation.

2. MMS Notification Memory Capacity

Preferred contents of "MMS notification memory capacity": The MMS-notification memory capacity contains the available memory for MMS-notifications.

Preferred coding of "MMS notification memory capacity": The MMS-notification memory capacity is coded in bytes.

3. MM Memory Capacity

Preferred contents of "MM memory capacity": The MM memory capacity contains the available memory for MMs.

Preferred coding of "MM memory capacity": The MM memory capacity is coded in bytes.

4. MMS Delivery Report Memory Capacity

Preferred contents of "MMS delivery report memory capacity": The MMS delivery report memory capacity is the available memory for delivery reports.

Preferred coding of "MMS delivery report memory capacity": The MMS delivery report memory capacity is coded in bytes.

5. MMS Read Reply Report Memory Capacity

Preferred contents of "MMS read-reply report memory capacity": The MMS read reply report memory capacity is the available memory for read reply reports.

Preferred coding of "MMS read-reply report memory capacity": The MMS read reply report memory capacity is coded in bytes.

d) $EF_{MMSP}$ (MMS Parameters)

This EF preferably includes values for Multimedia Messaging Service parameters, which can be used by the UE (User equipment) for user assistance in preparation of mobile multimedia messages, e.g., default values for parameters that are often used and/or which can be used by the MMS service provider to preconfigure the MMS service according to his particular needs. These Multimedia Messaging Service parameters are, for example, the originator address, the recipient address, the MMS Relay/Server address, the expiry time, the earliest time of delivery, the message class, the sender visibility request, the delivery report request, the read reply report request and the priority.

The advantage of storing these parameters on the USIM on the UICC (or any other storage medium according to the present invention) is, for example, that several of these parameters will be common for MMs sent by the subscriber; i.e., the user can define default values and, thus, experience a more comfortable service. Moreover, the service provider may preconfigure certain parameters, which allows for an automated processing of the MMS service by the terminal. In the latter case, the user does not have to set these parameters manually, which again increases the comfort.

Table 8 shows the preferred structure of every single record (an entry) of the elementary file.

TABLE 8

EF for MMS parameters

Identifier: "6FD3"    Structure: Linear fixed    Optional
Record length:    Update activity: low
H+I+J+K+L+M+N+O+P+Q+R+13 bytes
Access Conditions:
    READ      PIN
    UPDATE      PIN
    DEACTIVATE      ADM
    ACTIVATE      ADM

| Bytes | Description | M/O | Length |
|---|---|---|---|
| 1 to H | Alpha-Identifier | O | H bytes |
| H+1 to H+2 | Parameter Indicators | M | 2 bytes |
| H+3 | MMS Implementation | M | 1 byte |
| H+4 | Length of the originator address | O | 1 byte |
| H+5 | Length of the recipient address | O | 1 byte |
| H+6 | Length of the MMS Relay/Server address | O | 1 byte |
| H+7 | Length of the expiry time | O | 1 byte |
| H+8 | Length of earliest time of delivery | O | 1 byte |
| H+9 | Length of the message class | O | 1 byte |
| H+10 | Length of Sender visibility request | O | 1 byte |
| H+11 | Length of Delivery report request | O | 1 byte |

TABLE 8-continued

EF for MMS parameters

| | | | |
|---|---|---|---|
| H+12 | Length of Read reply report request | O | 1 byte |
| H+13 | Length of Priority | O | 1 byte |
| H+14 to H+I+13 | Originator address | O | I bytes |
| H+I+14 to H+I+J+13 | Recipient address | O | J bytes |
| H+I+J+14 to H+I+J+K+13 | MMS Relay/Server address | O | K bytes |
| H+I+J+K+14 to H+I+J+K+L+13 | Expiry time | O | L bytes |
| H+I+J+K+L+14 to H+I+J+K+L+M+13 | Earliest time of delivery | O | M bytes |
| H+I+J+K+L+M+14 to H+I+J+K+L+M+N+13 | Message class | O | N bytes |
| H+I+J+K+L+M+N+14 to H+I+J+K+L+M+N+O+13 | Sender visibility request | O | O byte |
| H+I+J+K+L+M+N+O+14 to H+I+K+L+M+N+O+P+13 | Delivery report request | O | P byte |
| H+I+J+K+L+M+N+O+P+14 to H+I+J+K+L+M+N+O+P+Q+13 | Read reply report request | O | Q byte |
| H+I+J+K+L+M+N+O+P+Q+14 to H+I+J+K+L+M+N+O+P+Q+R+13 | Priority | O | R byte |

According to Table 8, the $EF_{MMSP}$ preferably includes one or more of the following data:

1. Alpha-Identifier

Preferred contents: The alpha-identifier is an alpha Tag to the associated MMS-parameter. It can be defined by the USIM or the USIM application toolkit and, if available, it should be rendered to the user; i.e., it should be shown on the display.

Preferred coding: The alpha-identifier is coded as text string according to 3G TS 23.140 and WAP-209-MMSEncapsulation.

2. Parameter Indicators

Preferred contents: The parameters indicators contain the information if the MMS related parameters are present or not (see FIGS. 5 and 6).

Preferred Coding: Allocation of Bits:

Bit number Parameter indicated
   1 Length of originator address
   2 Length of recipient address
   3 Length of MMS Relay/Server address
   4 Length of expiry time
   5 Length of earliest time of delivery
   6 Length of message class
   7 Length of Sender visibility request
   8 Length of Delivery report request
   9 Length of Read reply report request
   10 Length of Priority
   11-16 Reserved for future use Bit value Meaning
   0 Parameter present.
   1 Parameter absent.

3. MMS Implementation

Preferred contents: The MMS Implementation contains the used protocol type; e.g., WAP, IP, etc. This information is used to indicate the MMS implementation type and version used for the MMS related information on the USIM and, thus, to ensure backwards compatibility.

Preferred Coding: Allocation of Bits:

Bit number Parameter indicated
   1 WAP implementation of MMS according to WAP-209-MMSEncapsulation, Version 17
   2-8 Reserved for future use Bit value Meaning
   0 Implementation not supported.
   1 Implementation supported.

4. Length of the Originator Address

Preferred contents: The length of the originator address contains the length of the originator address.

Preferred coding: The Length of the originator address is coded in bytes.

5. Length of the Recipient Address

Preferred contents: The length of the recipient address contains the length of the recipient address.

Preferred coding: The length of the recipient address is coded in bytes.

6. Length of the MMS Relay/Server Address

Preferred contents: The length of the MMS Relay/Server address contains the length of the address of the MMS Relay/Server.

Preferred coding: The length of the MMS Relay/Server address is coded in bytes.

7. Length of the Expiry Time

Preferred contents: The length of the expiry time contains the length of the expiry time.

Preferred coding: The length of the expiry time is coded in bytes.

8. Length of the Earliest Time of Delivery

Preferred contents: The length of the earliest time of delivery contains the length of the earliest time of delivery.

Preferred coding: The length of the earliest time of delivery is coded in bytes.

9. Length of the Message Class

Preferred contents: The length of the message class contains the length of the message class.

Preferred coding: The length of the message class is coded in bytes.

10. Sender Visibility Request

Preferred contents: The sender visibility request contains the request if the address/phone number of the sender to the recipient is shown unless the sender has a secret number. This is used for user assistance in the MM composition.

Preferred coding: The sender visibility request is coded according to 3G TS 23.140 and WAP-209-MMSEncapsulation.

11. Delivery Report Request

Preferred contents: The delivery report request contains the information if the delivery report is requested. This is used for user assistance in the MM composition.

Preferred coding: The delivery request is coded according to 3G TS 23.140 and WAP-209-MMSEncapsulation.

12. Read Reply Report Request

Preferred contents: The read reply report request contains the information if the read reply report is requested. This is used for user assistance in the MM composition.

Preferred coding: The read reply report is coded according to 3G TS 23.140 and WAP-209-MMSEncapsulation.

13. Priority

Preferred contents: The priority contains the priority (importance) of the message. This is used for user assistance in the MM composition.

Preferred coding: The priority is coded according to 3G TS 23.140 and WAP-209-MMSEncapsulation.

14. Originator Address

Preferred contents: The originator address contains the address of the originator. This originator address can be an MSISDN (Mobile Subscriber Integrated Services Digital Network) Number, an e-mail address or other operator specific addresses. This parameter can be used by the service provider to preconfigure the MMS service and it can be used for user assistance in the MM composition.

Preferred coding: The originator is coded according to 3G TS 23.140 and WAP-209-MMSEncapsulation.

15. Recipient Address

Preferred contents: The recipient address contains the address of the recipient. This recipient address can be an MSISDN (Mobile Subscriber Integrated Services Digital Network Number, an e-mail address or other operator specific addresses. This can be used for user assistance in the MM composition.

Preferred coding: The recipient is coded according to 3G TS 23.140 and WAP-209-MMSEncapsulation.

16. MMS Relay/Server Address

Preferred contents: The MMS Relay/Server address contains the address of the MMS Relay/Server. This parameter can be used by the service provider to preconfigure the MMS service. This address can be a configurable URI (Uniform Resource Identifier) and is given by the MMS Service Provider. It is necessary for the UA to know the address of the MMS Relay/Server, because the UA has to know where to submit MMs and MMS read-reply reports to.

Preferred coding: The MMS Relay/Server is coded according to 3G TS 23.140 and WAP-209-MMSEncapsulation.

17. Expiry Time

Preferred contents: The expiry time contains the length of the time that message is available. This parameter can be used by the service provider to preconfigure the MMS service and it can be used for user assistance in the MM composition.

Preferred coding: The expiry time is coded according to 3G TS 23.140 and WAP-209-MMSEncapsulation.

18. Earliest Time of Delivery

Preferred contents: The earliest time of delivery is the earliest time that the message is delivered. This parameter can be used by the service provider to preconfigure the MMS service and it can be used for user assistance in the MM composition.

Preferred coding: The earliest time of delivery is coded according to 3G TS 23.140 and WAP-209-MMSEncapsulation.

19. Message Class

Preferred contents: The message class contains the class of the multimedia message. This message class can be, for example, personal, advertisement, information service, etc. This is used for user assistance in the MM composition.

Preferred coding: The message class is coded according to 3G TS 23.140 and WAP-209-MMSEncapsulation.

In FIG. 5 an example of this $EF_{MMSP}$ is shown to describe the functionality of the parameter indicators. The bit structure of the 2 bytes long "Parameter Indicators" of FIG. 5 is also shown in FIG. 6.

In this example, bit 1, 2 and 3 of the parameter indicators equal "1", which means that the length of the $1^{st}$, $2^{nd}$ and $3^{rd}$ parameters (length of originator address, length of the recipient address and the length of the MMS Relay/Server address, and thus implicitly also the originator address, the recipient address and the MMS Relay/Server address) are present. The other bitsequal "0", which means that all other parameters are absent.

e) $EF_{MMSDR}$ (MMS Delivery Report)

This EF preferably includes information in accordance with 3G TS 23.140 and WAP-209-MMSEncapsulation including multimedia message delivery reports which have been received by the UA from the MMS Relay/Server. For every delivery report corresponding to an MM, this EF also refers to that associated MM.

Each record is preferably used to store the delivery report of a previously submitted MM in a record of $EF_{MM}$. The first byte of each record is preferably the link between the delivery report and the corresponding MM in $EF_{MM}$. Table 9 shows the preferred structure of every single record (an entry) of the elementary file.

TABLE 9

EF for MMS delivery report.

| Identifier: "6FD4" | Structure: Linear fixed | Optional |
|---|---|---|
| Record length: 1+S bytes | Update activity: low | |
| Access Conditions: | | |
| READ | PIN | |
| UPDATE | PIN | |
| DEACTIVATE | ADM | |
| | ACTIVATE | ADM |

| Bytes | Description | M/O | Length |
|---|---|---|---|
| 1 Status | MMS delivery record identifier | M | 1 |
| 2 to S+1 | MMS delivery report | M | S bytes |

According to Table 9, the $EF_{MMSDR}$ preferably includes one or more of the following data:

1. MMS Delivery Record Identifier

Preferred contents: The MMS delivery record identifier identifies the corresponding MM record in $EF_{MM}$; e.g., if this byte is coded "05" then this delivery report corresponds to the MM in record #5 of $EF_{MM}$.

Preferred Coding:

"00" empty record.

"01"-'FF' record number of the corresponding MM in $EF_{MM}$.

2. MMS Delivery Report

Preferred contents: The MMS delivery report contains the MMS-DELIVERY-REPORT as specified in 3G TS 23.140 and WAP-209-MMSEncapsulation, preferably with identical coding and ordering of parameters.

Preferred coding: The MMS delivery report is coded according to 3G TS 23.140 and WAP-209-MMSEncapsulation.

f) $EF_{MMSRR}$ (MMS Read Reply Report)

This EF preferably includes information in accordance with 3G TS 23.140 and WAP-209-MMSEncapsulation including multimedia message read reply reports which have been received by the UA from the MMS Relay/Server or are to be used as a UA originated message. For every read-reply report corresponding to an MM, this EF also refers to that associated MM.

Each record is preferably used to store the read reply report to an MM in a record of $EF_{MM}$. The first byte of each record is the link between the read reply report and the corresponding MM in $EF_{MM}$. Table 10 shows the preferred structure of every single record (an entry) of the elementary file.

TABLE 10

EF for MMS read reply report.

Identifier: "6FD5"  Structure: Linear fixed  Optional
Record length: T+1 bytes  Update activity: low
Access Conditions:
    READ  PIN
    UPDATE  PIN
    DEACTIVATE  ADM
    ACTIVATE  ADM

| Bytes | Description | M/O | Length |
|---|---|---|---|
| 1 Status | MMS read reply record identifier | M | 1 |
| 2 to T+1 | MMS read reply report | M | T bytes |

According to Table 10, the $EF_{MMSRR}$ preferably includes one or more of the following data:

1. MMS Read Reply Record Identifier

Preferred contents: The MMS read reply record identifier identifies the corresponding MM record in $EF_{MM}$; e.g., if this byte is coded "05" then this read reply report corresponds to the MM in record #5 of $EF_{MM}$.

Preferred Coding:

"00" empty record.

"01"-"FF" record number of the corresponding MM in $EF_{MM}$.

2. MMS Read Reply Report

Preferred contents: The MMS read reply report contains the MMS-READ_REPLY-REPORT as specified in 3G TS 23.140 and WAP-209-MMSEncapsulation, preferably with identical coding and ordering of parameters.

Preferred coding: The MMS read reply report is coded according to 3G TS 23.140 and WAP-209-MMSEncapsulation.

g) $EF_{MMSL}$ (MMS Size Limitations)

This EF preferably includes values for Multimedia Messaging Service header limitations, which can be defined by the authority that owns the USIM/UICC (in general, the network operator).

For the USIM only supporting a linear fixed file structure (see explanations above), the authority that owns the USIM/UICC needs to define a maximum length of each record (of every file). MMS-related information, however, is not limited to a certain size. Thus, there are no MMS-inherent pre-settings for the maximum length of MMS-related records.

This present invention thus proposes an $EF_{MMSL}$ wherein the authority that owns the USIM/UICC defines the maximum length of MMS-related records in a manner appropriate to this authority's needs. This EF can be read by a terminal (where the USIM/UICC is plugged in to) upon booting the card in order to be informed of the authorities settings. According to these settings, the terminal then has to cut MMS-related information in case these exceed the limitations.

Table 11 shows the preferred structure of every single record (an entry) of the elementary file $EF_{MMSL}$.

TABLE 11

EF for MMS limitations.

Identifier: "6FD6"  Structure: Linear fixed  Optional
Record length: 14 bytes  Update activity: low
Access Conditions:
    READ  PIN
    UPDATE  PIN
    DEACTIVATE  ADM
    ACTIVATE  ADM

| Bytes | Description | M/O | Length |
|---|---|---|---|
| 1 to 2 | Length of a record in $EF_{MMSN}$ | O | 2 bytes |
| 3 to 6 | Length of a record in $EF_{MM}$ | O | 4 bytes |
| 7 to 8 | Length of a record in $EF_{MMSS}$ | O | 2 bytes |
| 9 to 10 | Length of a record in $EF_{MMSP}$ | O | 2 bytes |
| 11 to 12 | Length of a record in $EF_{MMSDR}$ | O | 2 bytes |
| 13 to 14 | Length of a record in $EF_{MMSRR}$ | O | 2 bytes |

According to Table 11, the $EF_{MMSL}$ preferably includes one or more of the following data:

1. Length of a Record in $EF_{MMSN}$ (MMS Notification)

Preferred contents/preferred coding: Defines the length of a record in $EF_{MMSN}$; i.e., the maximum size of an MMS notification that can be stored on the USIM, which is 1+A (see above), in bytes. For the length of a record in $EF_{MMSN}$ encoded as a 2 byte number, the maximum possible value is 64 kbyte.

2. Length of a Record in $EF_{MM}$ (Multimedia Message)

Preferred contents/preferred coding: Defines the length of a record in $EF_{MM}$; i.e., the maximum size of a Multimedia Message that can be stored on the USIM, which is 1+B (see above), in bytes. For the length of a record in $EF_{MMSN}$ encoded as a 4 byte number, the maximum possible value is 4 Giga-Byte.

3. Length of a Record in $EF_{MMSS}$ (MMS Status)

Preferred contents/preferred coding: Defines the length of a record in $EF_{MMSS}$; i.e., the maximum size of an MMS status entry that can be stored on the USIM, which is C+D+E+F+G (see above), in bytes. For the length of a record in $EF_{MMSS}$ encoded as a 2 byte number, the maximum possible value is 64 kbyte.

4. Length of a Record in $EF_{MMSS}$ (MMS Status)

Preferred contents/preferred coding: Defines the length of a record in $EF_{MMSS}$; i.e., the maximum size of an MMS status entry that can be stored on the USIM, which is C+D+E+F+G (see above), in bytes. For the length of a record in $EF_{MMSS}$ encoded as a 2 byte number, the maximum possible value is 64 kbyte.

5. Length of a Record in $EF_{MMSP}$ (MMS Parameter)

Preferred contents/preferred coding: Defines the length of a record in $EF_{MMSP}$; i.e., the maximum size of an MMS parameter entry that can be stored on the USIM, which is H+I+J+K+L+M+N+O+P+Q+R+13 (see above), in bytes. For the length of a record in $EF_{MMSP}$ encoded as a 2 byte number, the maximum possible value is 64 kbyte.

6. Length of a Record in $EF_{MMSDR}$ (MMS Delivery Report)

Preferred contents/preferred coding: Defines the length of a record in $EF_{MMSDR}$; i.e., the maximum size of an MMS delivery report that can be stored on the USIM, which is 1+S (see above), in bytes. For the length of a record in $EF_{MMSDR}$ encoded as a 2 byte number, the maximum possible value is 64 kbyte.

7. Length of a Record in $EF_{MMSRR}$ (MMS Read-Reply Report)

Preferred contents/preferred coding: Defines the length of a record in $EF_{MMSRR}$; i.e., the maximum size of an MMS read-reply report that can be stored on the USIM, which is 1+T (see above), in bytes. For the length of a record in EFFMMSRR encoded as a 2 byte number, the maximum possible value is 64 kbyte.

h) $EF_{UST}$ (USIM Service Table)

This EF indicates to a UE which services are available in a USIM. If a service is not indicated as available in the USIM, the UE shall not select this service. From the USIM Service Table, a UE can immediately retrieve the information whether or not a USIM supports the MMS service.

Table 12 shows the preferred structure of every single record (an entry) of the elementary file.

TABLE 12

EF for the USIM service table.

| Identifier: "6F38" | Structure: transparent | Mandatory |
|---|---|---|
| SFI: "04" | | |
| File size: X bytes, X >= 1 | | Update activity: low |
| Access Conditions: | | |
| READ | PIN | |
| UPDATE | ADM | |
| DEACTIVATE | ADM | |
| ACTIVATE | ADM | |

| Bytes | Description | M/O | Length |
|---|---|---|---|
| 1 | Services n°1 to n°8 | M | 1 byte |
| 2 | Services n°9 to n°16 | O | 1 byte |
| 3 | Services n°17 to n°24 | O | 1 byte |
| | Services n°25 to n°32 | O | 1 byte |
| etc. | | | |
| X | Services n°(8X-7) to n°(8X) | O | 1 byte |

The Services n°1 to n°50 may have the content as listed in Table 13. Here, the Services n°1 to n°50 refer to MMS-related information of which one or more preferably are included in the elementary file according to the present invention.

TABLE 13

Preferred services of the USIM service table.

| Services contents: | Service n°1: | Local Phone Book |
|---|---|---|
| | Service n°2: | Fixed Dialing Numbers (FDN) |
| | Service n°3: | Extension 2 |
| | Service n°4: | Service Dialing Numbers (SDN) |
| | Service n°5: | Extension 3 |
| | Service n°6: | Barred Dialing Numbers (BDN) |
| | Service n°7: | Extension 4 |
| | Service n°8: | Outgoing Call Information (OCI and OCT) |
| | Service n°9: | Incoming Call Information (ICI and ICT) |
| | Service n°10: | Short Message Storage (SMS) |
| | Service n°11: | Short Message Status Reports (SMSR) |
| | Service n°12: | Short Message Service Parameters (SMSP) |
| | Service n°13: | Advice of Charge (AoC) |
| | Service n°14: | Capability Configuration Parameters (CCP) |
| | Service n°15: | Cell Broadcast Message Identifier |
| | Service n°16: | Cell Broadcast Message Identifier Ranges |
| | Service n°17: | Group Identifier Level 1 |
| | Service n°18: | Group Identifier Level 2 |
| | Service n°19: | Service Provider Name |
| | Service n°20: | User controlled PLMN selector with Access Technology |
| | Service n°21: | MSISDN |
| | Service n°22: | Image (IMG) |
| | Service n°23: | Not used (reserved for SoLSA) |
| | Service n°24: | Enhanced Multi-Level Precedence and Pre-emption Service |
| | Service n°25: | Automatic Answer for Emlpp |

TABLE 13-continued

Preferred services of the USIM service table.

| Service n°26: | RFU |
|---|---|
| Service n°27: | GSM Access |
| Service n°28: | Data download via SMS-PP |
| Service n°29: | Data download via SMS-CB |
| Service n°30: | Call Control by USIM |
| Service n°31: | MO-SMS Control by USIM |
| Service n°32: | RUN AT COMMAND command |
| Service n°33: | Packet Switched Domain |
| Service n°34: | Enabled Services Table |
| Service n°35: | APN Control List (ACL) |
| Service n°36: | Depersonalization Control Keys |
| Service n°37: | Co-operative Network List |
| Service n°38: | GSM security context |
| Service n°39: | CPBCCH Information |
| Service n°40: | Investigation Scan |
| Service n°41: | MexE |
| Service n°42: | Operator controlled PLMN selector with Access Technology |
| Service n°43: | HPLMN selector with Access Technology |
| Service n°44: | Multimedia Message Notification |
| Service n°45: | Multimedia Message Service Storage |
| Service n°46: | Multimedia Message Service Delivery Report |
| Service n°47: | Multimedia Message Read Reply Report |
| Service n°48: | Multimedia Message Parameters |
| Service n°49: | Multimedia Message Service Status |
| Service n°50: | Multimedia Message Service Limitations |

The EF shall contain at least one byte. Further bytes may be included, but if the EF includes an optional byte, then it is mandatory for the EF to also contain all bytes before that byte. Other services are possible in the future and will be coded on further bytes in the EF.

Preferred Coding:

1 bit is used to code each service:

bit=1: service available;

bit=0: service not available.

Service available means that the USIM has the capability to support the service and that the service is available for the user of the USIM unless the service is identified as "disabled" in $EF_{EST}$, another elementary file on the USIM.

Service not available means that the service shall not be used by the USIM user, even if the USIM has the capability to support the service.

The preferred coding of each byte in $EF_{UST}$ is shown in Tables 14 and 15.

TABLE 14

Preferred coding of the first byte of the USIM service table.

First byte: b8 b7 b6 b5 b4 B3 b2 b1

- Service n°1
- Service n°2
- Service n°3
- Service n°4
- Service n°5
- Service n°6
- Service n°7
- Service n°8

TABLE 15

Preferred coding of the second byte of the USIM service table. etc.

Second byte: b8 b7 b6 b5 b4 b3 b2 b1

- b1: Service n°9
- b2: Service n°10
- b3: Service n°11
- b4: Service n°12
- b5: Service n°13
- b6: Service n°14
- b7: Service n°15
- b8: Service n°16

With regard to the Services n°44 to n°50 of Table 13:

The Parameter "Multimedia Message Notification" indicates whether $EF_{MMSN}$ is supported on the USIM.

The Parameter "Multimedia Message Service Storage" indicates whether $EF_{MM}$ is supported on the USIM.

The Parameter "Multimedia Message Service Delivery Report" indicates whether $EF_{MMSDR}$ is supported on the USIM.

The Parameter "Multimedia Message Read Reply Report" indicates whether $EF_{MMSRR}$ is supported on the USIM.

The Parameter "Multimedia Message Parameters" indicates whether $EF_{MMSP}$ is supported on the USIM.

The Parameter "Multimedia Message Service Status" indicates whether $EF_{MMSS}$ is supported on the USIM.

The Parameter "Multimedia Message Service Limitations" indicates whether $EF_{MMSL}$ is supported on the USIM.

Figure 7:
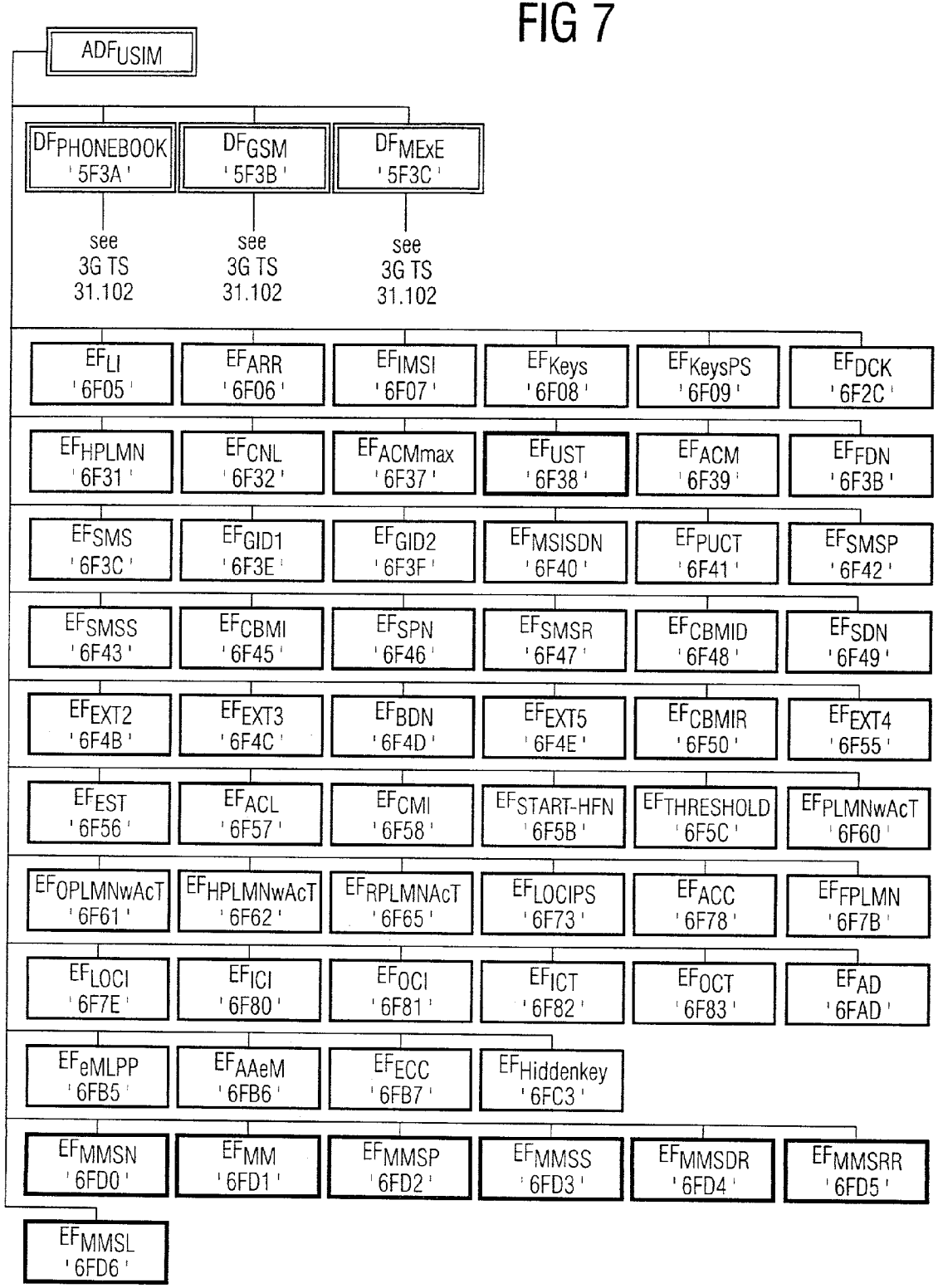
FIG. 7 shows storage of MMS-related information on a USIM according to one embodiment of the present invention.

FIG. 7 shows an example how storage of MMS-related information on the USIM can be achieved according to this first preferred mechanism described above. The elementary files proposed above that contain MMS-related information are marked as bold boxes.

II. Storage of MMS Related Information in One Universal File

The second preferred embodiment is the storage of MMS-related information in one universal/generic file dedicated to MMS. All the MMS-related information preferably will be saved in one universal/generic file. The advantage of using one universal/generic file is the optimization of the used memory. Table 16 shows the preferred structure of every single record (an entry) of the elementary file $EF_{MMS}$.

TABLE 16

Universal EF for MMS related information.

| Identifier: "6FD5" | Structure: Linear fixed | Optional |
|---|---|---|
| Record length: U+2 bytes | Update activity: low | |

Access Conditions:
- READ       PIN
- UPDATE     PIN
- DEACTIVATE ADM
- ACTIVATE   ADM

| Bytes | Description | M/O | Length |
|---|---|---|---|
| 1 | Status | M | 1 byte |
| 2 | Message type | M | 1 byte |
| 3 to U+2 | Message | M | U bytes |

According to Table 16, the $EF_{MMS}$ preferably contains one or more of the following data:

1. Status

The preferred contents and preferred coding of the Status is according to the example of the $EF_{MMSN}$.

2. Message Type

Preferred contents: The message type contains the information which message type is used. Possible message types are shown, together with their preferred encoding, in Table 17.

Preferred Coding:

TABLE 17

Preferred coding of the message type.

| b8 | b7 | b6 | b5 | B4 | b3 | b2 | b1 | |
|---|---|---|---|---|---|---|---|---|
| | | | | X | X | X | 0 | Free space |
| | | | | X | X | X | 1 | Used space |
| | | | | 0 | 0 | 0 | 1 | MMS notification |
| | | | | 0 | 0 | 1 | 1 | MM |
| | | | | 0 | 1 | 0 | 1 | Delivery report |
| | | | | 0 | 1 | 1 | 1 | Read reply report |
| | | | | | | | | Reserved for future |

3. Message

Preferred contents: The message content is the information of the selected message type according to the description of that message type in example I.

Preferred coding: The coding of the selected message type is in accordance to the description of that message type described in example I.

For this second proposal it is seen valuable to have $EF_{UST}$, $EF_{MMSP}$ and $EF_{MMSS}$ in addition to $EF_{MMS}$ as in the first proposal.

III. Storage of the MMS Notification in $EF_{SMS}$

The third preferred embodiment is the storage of the MMS notification in $EF_{SMS}$, an elementary file used for the storage of short messages (SMS). At least in the early beginnings of MMS, notifications will be sent encapsulated in a short message. This is why MMS notifications can be stored in $EF_{SMS}$.

The advantage of this proposal is that the existing file structure of the USIM can be used unchanged. The disadvantage is that other important MMS-related information can not be stored.

The elementary file $EF_{SMS}$ (Short messages) preferably contains information in accordance with 3G TS 31.101 (3GPP TS 31.101 V3.3.0, UICC-Terminal Interface; Physical and Logical Characteristics) including short messages (and associated parameters) which have either been received by the UE from the network, or are to be used as a UE originated message. Table 18 shows the preferred structure of every single record (an entry) of the elementary file.

TABLE 18

EF for SMS.

| Identifier: "6F3C" | Structure: linear fixed | Optional |
|---|---|---|
| Record length: 176 bytes | Update activity: low | |

Access Conditions:
- READ       PIN
- UPDATE     PIN
- DEACTIVATE ADM
- ACTIVATE   ADM

| Bytes | Description | M/O | Length |
|---|---|---|---|
| 1 | Status | M | 1 byte |
| 2 to 176 | Remainder | M | 175 bytes |

The $EF_{SMS}$ preferably contains one or more of the following data:

1. Status

Preferred contents: The Status byte of the record can be used as a pattern in the SEARCH RECORD command. For UE (User Equipment) originating messages sent to the network, the status preferably shall be updated when the UE receives a status report, or sends a successful SMS Command relating to the status report.

Preferred Coding:

TABLE 19

Preferred coding for the status byte.

| b8 | b7 | b6 | b5 | b4 | b3 | b2 | b1 | |
|---|---|---|---|---|---|---|---|---|
|   |   |   |   |   | X | X | 0 | free space |
|   |   |   |   | X | X | X | 1 | used space |
|   |   |   |   | 0 | 0 | 0 | 1 | Message received by UE from network; message read |
|   |   |   |   | 0 | 0 | 1 | 1 | Message received by UE from network; message to be read |
|   |   |   |   | 0 | 1 | 1 | 1 | UE originating message; message to be sent |
|   |   |   |   | 1 | 0 | 0 | 1 | MMS notification Reserved for future (see 3G TS 31.101 [11]) |

| b8 | b7 | b6 | b5 | b4 | b3 | B2 | b1 | |
|---|---|---|---|---|---|---|---|---|
|   |   |   | X | X | 1 | 0 | 1 | UE originating message; message sent to the network: |
|   |   |   | 0 | 0 | 1 | 0 | 1 | Status report not requested |
|   |   |   | 0 | 1 | 1 | 0 | 1 | Status report requested, but not (yet) received; |
|   |   |   | 1 | 0 | 1 | 0 | 1 | Status report requested, received, but not stored in EF-SMSR; |
|   |   |   | 1 | 1 | 1 | 0 | 1 | Status report requested, received and stored in EF-SMSR; RFU (see 3G TS 31.101 [11]) |

2. Remainder

The Remainder is proposed to be as in 3G TS 31.101. That is, if a UE receives an MMS notification from the network, as long as this notification is carried in a short message (SMS), the notification can be stored in $EF_{SMS}$ with a status byte equal to "0000 1001" in binary presentation, which is "09" in hexadecimal presentation. For this third proposal it is seen valuable to have $EF_{UST}$, $EF_{MMSP}$ and $EF_{MMSS}$ in addition to $EF_{SMS}$ as in the first proposal.

In summary, important aspects of the present invention are:

Storage/Accessing of MMS related information or parts of MMS-related information on media different from the user's terminal, especially:
- on a SIM or on a USIM on a UICC;
- on a WIM;
- on a smart card which is not one of the above, especially an MMC (Multimedia Card);
- a combination of these storage possibilities.

The following information preferably is stored on such a repository:
- MMS notifications,
- entire or parts of a Multimedia Message (MM);
- MMS delivery reports;
- MMS read-reply reports;
- MMS parameters;
- MMS status information;
- MMS limitations information (defined by the authority that owns the smart card);
- an indication of the smart card supporting MMS (e.g., in the USIM service table).

Three different mechanisms are preferred of how to achieve the storage of MMS-related information and how to access stored MMS-related information on a smart card; in particular, on a SIM or a USIM on a UICC:
- storage of MMS-related information in several elementary files;
- storage of MMS-related information in one universal elementary file;
- storage of the MMS notification in the existing elementary file $EF_{SMS}$.

While the present invention has been described with reference to specific embodiments, those of skill in the art will recognize that changes may be made thereto without departing from the spirit and scope of the invention as set forth in the hereafter appended claims.

The invention claimed is:

1. A method for storing MMS-related information, the method comprising:

at least one of (a) storing and (b) accessing the MMS-related information on at least one of a subscriber identity module and a UMTS subscriber identity module on a universal circuit card connected to or in a first apparatus, the first apparatus being one of a mobile communication apparatus which supports MMS services and a device connected to the mobile communication apparatus;

enabling the at least one subscriber identity module and a UMTS subscriber identity module on a universal circuit card to be disconnectable from the first apparatus, wherein the MMS-related information is stored in at least one file on the at least one of a subscriber identity module and a UMTS subscriber identity module on a universal circuit card, the at least one file being at least one of a plurality of elementary files, dedicated files and a master file;

wherein the MMS-related information includes at least one of MMS notifications, entire Multimedia Messages, parts of Multimedia Messages, MMS status information, MMS delivery reports, MMS read-reply reports, MMS parameters, MMS limitations information and an indication of available MMS services;

wherein the MMS-related information is stored in separate elementary files on the at least one of a subscriber identity module and a UMTS subscriber identity module on a universal circuit card;

wherein the files are part of an elementary file structure of the at least one of a subscriber identity module and a UMTS subscriber identity module on a universal circuit card, and the files are one of already existing and added to the file structure;

wherein a status byte is included in records of an elementary file which includes at least one MMS notification, and the status byte includes information regarding a status of at least one of an MMS notification message, a delivery report and a Multimedia Message retrieval; and wherein the status byte is updated when the at least one of a subscriber identity module and a UMTS subscriber identity module on a universal circuit card is connected to a user agent, and the user agent receives at least one of an MMS notification, a Multimedia Message, an MMS delivery report and an MMS read-reply report.

2. The method for storing MMS-related information as claimed in claim 1, wherein the MMS-related information may be accessed by the first apparatus which is further adapted to process the MMS-related information.

3. The method for storing MMS-related information as claimed in claim 1, wherein the MMS-related information is one of terminal-originated and terminal-terminated.

4. The method for storing MMS-related information as claimed in claim 1, wherein the at least one file has a file structure which is one of transparent, linear fixed, linear variable and linear cyclic.

5. The method for storing MMS-related information as claimed in claim 1, wherein a status byte is included in records of an elementary file which includes at least one Multimedia Message, and the status byte includes information regarding at least one of receipt of a Multimedia Message, a reading status of a Multimedia Message, an origin of a Multimedia Message, a submission of a Multimedia Message, a delivery report and a read-reply report.

6. The method for storing MMS-related information as claimed in claim 1, wherein the status byte is used as a pattern in a Search Record command being a function on an interface between a terminal of the first apparatus and the at least one of a subscriber identity module and a UMTS subscriber identity module on a universal circuit card.

7. The method for storing MMS-related information as claimed in claim 1, wherein records of an elementary file which relates to MMS-related status information includes at least one of a unique reference assigned to the Multimedia Message, available memory for MMS-notifications, available memory for Multimedia Messages, available memory for delivery reports and available memory for read reply reports.

8. The method for storing MMS-related information as claimed in claim 1, wherein records of an elementary file which relates to MMS-related values for Multimedia Messaging parameters includes at least one of an alpha tag associated with the MMS parameter, parameter indicators which indicate a presence of MMS-related parameters, MMS implementation which indicates a used protocol, a length of an originator address, a length of a recipient address, a length of an MMS relay/server address, a length of an expiry time, a length of an earliest time of delivery, a length of a message class, a length of a sender visibility request, a length of a delivery report request, a length of a read reply report request, a length of a priority of message, an originator address, a recipient address, an MMS relay/server address, an expiry time of message, an earliest time of delivery of message, a message class, a sender visibility request, a delivery report request, a read reply report request and a priority of message.

9. The method for storing MMS-related information as claimed in claim 1, wherein records of an elementary file which relates to Multimedia Message delivery reports includes at least one of an MMS delivery report identifier identifying a corresponding Multimedia Message record in an elementary file, and an MMS delivery report containing an MMS delivery record.

10. The method for storing MMS-related information as claimed in claim 1, wherein records of an elementary file which relates to Multimedia Message read reply reports include at least one of an MMS read reply record identifier identifying a corresponding Multimedia Message record in an elementary file, and an MMS read reply containing an MMS read reply record.

11. The method for storing MMS-related information as claimed in claim 1, wherein records of an elementary file which includes values for MMS record size limitations, defined by an authority owning the at least one of a subscriber identity module and a UMTS subscriber identity module on a universal circuit card, includes at least one of a length of a record in an elementary file which includes at least one MMS notification, a length of a record in an elementary file which includes at least one Multimedia Message, a length of a record in an elementary file which relates to MMS-related status information, a length of a record in an elementary file which relates to MMS-related values for Multimedia Messaging parameters, a length of a record in an elementary file which relates to Multimedia Message delivery reports and a length of a record in an elementary file which relates to Multimedia Message read reply reports.

12. The method for storing MMS-related information as claimed in claim 1, wherein at least one MMS service is added to records of an elementary file which relates to a USIM service table.

13. The method for storing MMS-related information as claimed in claim 1, wherein a generic elementary file includes at least one of a status of a 35 Multimedia Message, a message type and a message content.

14. The method for storing MMS-related information as claimed in claim 1, wherein MMS notification messages are stored in an elementary file containing information which includes short messages, the short messages being one of mobile terminated and mobile originated.

15. The method for storing MMS-related information as claimed in claim 1, wherein a status byte is included in records of the elementary file, and the status byte includes information regarding the MMS notification.

16. The method for storing MMS-related information as claimed in claim 15, wherein the status byte is used as a pattern in a search report command being a function on an interface between a terminal of the first apparatus and the at least one of a subscriber identity module and a UMTS subscriber identity module on a universal circuit card.

17. A method for storing MMS-related information, the method comprising:
at least one of (a) storing, and (b) accessing the MMS-related information on at least one of a subscriber identity module and a UMTS subscriber identity module on a universal circuit card connected to or in a first apparatus, the first apparatus being one of a mobile communication apparatus which supports MMS services and a device connected to the mobile communication apparatus;
enabling the at least one subscriber identity module and a UMTS subscriber identity module on a universal circuit card to be disconnectable from the first apparatus, wherein the MMS-related information is stored in at least one file on the at least one of a subscriber identity module and a UMTS subscriber identity module on a universal circuit card, the at least one file being at least one of a plurality of elementary files, dedicated files and a master file;
wherein the MMS-related information includes at least one of MMS notifications, entire Multimedia Messages, parts of Multimedia Messages, MMS status information, MMS delivery reports, MMS read-reply reports, MMS parameters, MMS limitations information and an indication of available MMS services;
wherein the MMS-related information is stored in separate elementary files on the at least one of a subscriber identity module and a UMTS subscriber identity module on a universal circuit card;
wherein the files are part of an elementary file structure of the at least one of a subscriber identity module and a UMTS subscriber identity module on a universal circuit card, and the files are one of already existing and added to the file structure;
wherein a status byte is included in records of an elementary file which includes at least one MMS notification, and the status byte includes information regarding a status of at least one of an MMS notification message, a delivery report and a Multimedia Message retrieval; and wherein the status byte is updated when the at least one of a subscriber identity module and a UMTS subscriber identity module on a universal circuit card is connected to a user agent, and the user agent originates at least one of a Multimedia Message, an allowance of creation of an MMS delivery report and an MMS read-reply report to be stored on the at least one of a subscriber identity module and a UMTS subscriber identity module on a universal circuit card.

18. An apparatus which supports MMS services, comprising:
   at least one of a subscriber identity module and a UMTS subscriber identity module on a universal circuit card for storing MMS-related information;
   parts for processing the MMS-related information; and
   parts for connecting and disconnecting to and from the at least one of a subscriber identity module and a UMTS subscriber identity module on a universal circuit card,
   wherein the MMS-related information is stored in at least one file on the at least one of a subscriber identity module and a UMTS subscriber identity module on a universal circuit card, the at least one file being at least one of a plurality of elementary files, dedicated files and a master file,
   wherein the MMS-related information includes at least one of MMS notifications, entire Multimedia Messages, parts of Multimedia Messages, MMS status information, MMS delivery reports, MMS read-reply reports, MMS parameters, MMS limitations information and an indication of available MMS services;
   wherein the MMS-related information is stored in separate elementary files on the at least one of a subscriber identity module and a UMTS subscriber identity module on a universal circuit card;
   wherein the files are part of an elementary file structure of the at least one of a subscriber identity module and the UMTS subscriber identity module on the universal circuit card, and the files are one of already existing and added to the file structure;
   wherein a status byte is included in records of an elementary file which includes at least one MMS notification, and the status byte includes information regarding a status of at least one of an MMS notification message, a delivery report and a Multimedia Message retrieval; and
   wherein the status byte is updated when the at least one of a subscriber identity module and a UMTS subscriber identity module on a universal circuit card is connected to a user agent, and the user agent originates at least one of a Multimedia Message, an allowance of creation of an MMS delivery report and an MMS read-reply report to be stored on the at least one of a subscriber identity module and a UMTS subscriber identity module on a universal circuit card.

19. The apparatus as claimed in claim 18, wherein the apparatus is a mobile communication apparatus.

20. The apparatus as claimed in claim 19, wherein the mobile communication apparatus is a mobile phone.

21. The apparatus as claimed in claim 18, wherein the apparatus is an 35 external device connectable to a mobile communication apparatus, with the mobile communication apparatus being one of a notebook, a laptop and an electronic organizer.

22. A method for storing and/or accessing MMS-related information, comprising at least one of (a) storing information and (b) accessing information on at least one of a subscriber identity module and a UMTS subscriber identity module on a universal integrated circuit card-connected to or in a mobile communication apparatus which supports MMS services, said subscriber identity module or UMTS subscriber identity module being disconnectable from said mobile communication apparatus, wherein at least one MMS notification is stored and/or accessed in at least one elementary file on said subscriber identity module or UMTS subscriber identity module, wherein a status byte is included in records of the at least one elementary file wherein the status byte comprises information regarding the status of the MMS notification message, the delivery report and/or the multimedia message retrieval, wherein the MMS-related information is stored in at least one file on the at least one of a subscriber identity module and a UMTS subscriber identity module on a universal circuit card, the at least one file being at least one of a plurality of elementary files, dedicated files and a master file; and wherein the status byte is updated when said at least one of a subscriber identity module and a UMTS subscriber identity module on a universal circuit card is connected to an User Agent and said User Agent receives an MMS notification, receives an multimedia message, receives an MMS delivery report and/or receives an MMS read-reply report or originates a multimedia message, allows/disallows the creation of an MMS delivery report and/or originates an MMS read-reply report to be stored on said at least one of a subscriber identity module and a UMTS subscriber identity module on a universal circuit card.

23. The method according to claim 22, wherein the MMS-related information is terminal-originated or terminal-terminated.

24. The method according to claim 22, wherein the files are of transparent, linear fixed, linear variable or linear cyclic file structure.

25. The method according to claim 22, wherein a status byte is included in records of a file which comprises at least one multimedia message wherein the status byte comprises information regarding the receipt of a multimedia message, the reading status of a multimedia message, the origin of a multimedia message, the submission of a multimedia message, the delivery report and/or the read-reply report.

26. The method according to claim 22, wherein the status byte is used as a pattern in the SEARCH RECORD command of MMS being a function on an interface between the terminal of said apparatus or said device and said at least one of a subscriber identity module and a UMTS subscriber identity module on a universal circuit card.

27. The method according to claim 22, wherein one or more of the following information are included and/or accessed in the records of a file which relates to MMS-related status information:
   a unique reference assigned to the multimedia message as Message-ID;
   available memory for MMS-notifications as MMS notification memory capacity;
   available memory for multimedia messages as multimedia message memory capacity;
   available memory for delivery reports as MMS delivery report memory; and
   available memory for read reply reports as MMS read reply report memory capacity.

28. The method according to claim 22, wherein one or more of the following information are included and/or accessed in the records of a file which relates to MMS-related values for Multimedia Messaging Parameters:
Alpha Tag associated to the MMS-parameter as Alpha-Identifier;
Parameter Indicators which indicate the presence of MMS 30 related parameters;
MMS Implementation which indicate the used protocol;
Length of the originator address;
Length of the recipient address;
Length of the MMS Relay/Server address;
Length of the expiry time;
Length of earliest time of delivery;
Length of the message class;
Length of Sender visibility request;
Length of Delivery report request;
Length of Read reply report request;
Length of Priority of message;
Originator address;
Recipient address;
MMS Relay/Server address;
Expiry time of message;
Earliest time of delivery of message;
Message class;
Sender visibility request;
Delivery report request;
Read reply report request; and
Priority of message.

29. The method according to claim 22, wherein one or more of the following information are included and/or accessed in the records of a file which relates to multimedia message delivery reports:
MMS delivery report identifier identifying the corresponding multimedia record in the elementary file; and
MMS delivery report containing MMS-DELIVERY-RECORD.

30. The method according to claim 22, wherein one or more of the following information are included in the records of a file which relates to multimedia-message read reply reports:
MMS read reply record identifier identifying the corresponding multimedia message record in the elementary file and
MMS read reply containing MMS-READ-REPLY-RECORD.

31. The method according to claim 22, wherein one or more of the following information are included and/or accessed in the records of a file which comprises values for MMS record size limitations, defined by the authority owning said at least one of a subscriber identity module and a UMTS subscriber identity module on a universal circuit card:
Length of a record in the file for MMS notification message;
Length of a record in the file for multimedia message or parts thereof;
Length of a record in the file for MMS status information;
Length of a record in the file for MMS parameters;
Length of a record in the file for MMS delivery report; and
Length of a record in the file for MMS read reply report.

32. The method according to claim 22, wherein one or more MMS-services are added to the records of an elementary file containing a USIM Service Table for Multimedia Message Notification, Multimedia Message Service Storage, Multimedia Message Service Delivery Report, Multimedia Message Read Reply Report, Multimedia Message Parameters, Multimedia Message Service Status, and Multimedia Message Service Limitations.

33. The method according to claim 22, wherein one or more of the following information are stored and/or accessed in one generic elementary file:
received, originated, submitted Status of the Multimedia Message;
Message type; and
Message content.

34. The method according to claim 22, wherein MMS notification messages are stored and/or accessed in an elementary file containing information which comprise mobile terminated or mobile originated short messages.

35. The method according to claim 34, wherein a status byte is included in the records of said elementary file, said status byte comprising information regarding the MMS notification.

36. The method according to claim 35, wherein the status byte is used as a pattern in the SEARCH RECORD command of MMS services being a function on the interface between the terminal of said apparatus or said device and said at least one of a subscriber identity module and a UMTS subscriber identity module on a universal circuit card.

37. The method according to claim 22, wherein the apparatus is a mobile communication apparatus, especially a mobile phone.

38. The method according to claim 22, wherein the apparatus is an external device connectable to a mobile communication apparatus, especially a notebook, a laptop or an electronic organizer.

39. A program of instructions embodied in a storage medium, the program of instructions, when executed, configured to:
at least one of (a) store the MMS-related information, and (b) access the MMS-related information on at least one of a subscriber identity module and a UMTS subscriber identity module on a universal circuit card connected to or in a first apparatus, the first apparatus being one of a mobile communication apparatus which supports MMS services and a device connected to the mobile communication apparatus; and
enable the at least one subscriber identity module and a UMTS subscriber identity module on a universal circuit card to be disconnectable from the first apparatus, wherein the MMS-related information is stored in at least one file on the at least one of a subscriber identity module and a UMTS subscriber identity module on a universal circuit card, the at least one file being at least one of a plurality of elementary files, dedicated files and a master file;
wherein the MMS-related information includes at least one of MMS notifications, entire Multimedia Messages, parts of Multimedia Messages, MMS status information, MMS delivery reports, MMS read-reply reports, MMS parameters, MMS limitations information and an indication of available MMS services;
wherein the MMS-related information is stored in separate elementary files on the at least one of a subscriber identity module and a UMTS subscriber identity module on a universal circuit card;
wherein the files are part of an elementary file structure of the at least one of a subscriber identity module and a UMTS subscriber identity module on a universal circuit card, and the files are one of already existing and added to the file structure;
wherein a status byte is included in records of an elementary file which includes at least one MMS notification, and the status byte includes information regarding a status of at least one of an MMS notification message, a delivery report and a Multimedia Message retrieval; and wherein the status byte is updated when the at least one of a subscriber identity module and a UMTS subscriber identity module on a universal circuit card is connected to a user agent, and the user agent receives at least one of an MMS notification, a Multimedia Message, an MMS delivery report and an MMS read-reply report.

40. A program of instructions embodied in a storage medium, the program of instructions, when executed, configured to:

at least one of (a) storing the MMS-related information, and (b) accessing the MMS-related information on at least one of a subscriber identity module and a UMTS subscriber identity module on a universal circuit card connected to or in a first apparatus, the first apparatus being one of a mobile communication apparatus which supports MMS services and a device connected to the mobile communication apparatus;

enabling the at least one subscriber identity module and a UMTS subscriber identity module on a universal circuit card to be disconnectable from the first apparatus, wherein the MMS-related information is stored in at least one file on the at least one of a subscriber identity module and a UMTS subscriber identity module on a universal circuit card, the at least one file being at least one of a plurality of elementary files, dedicated files and a master file;

wherein the MMS-related information includes at least one of MMS notifications, entire Multimedia Messages, parts of Multimedia Messages, MMS status information, MMS delivery reports, MMS read-reply reports, MMS parameters, MMS limitations information and an indication of available MMS services;

wherein the MMS-related information is stored in separate elementary files on the at least one of a subscriber identity module and a UMTS subscriber identity module on a universal circuit card;

wherein the files are part of an elementary file structure of the at least one of a subscriber identity module and a UMTS subscriber identity module on a universal circuit card, and the files are one of already existing and added to the file structure;

wherein a status byte is included in records of an elementary file which includes at least one MMS notification, and the status byte includes information regarding a status of at least one of an MMS notification message, a delivery report and a Multimedia Message retrieval; and wherein the status byte is updated when the at least one of a subscriber identity module and a UMTS subscriber identity module on a universal circuit card is connected to a user agent, and the user agent originates at least one of a Multimedia Message, an allowance of creation of an MMS delivery report and an MMS read-reply report to be stored on the at least one of a subscriber identity module and a UMTS subscriber identity module on a universal circuit card.

41. A program of instructions embodied in a storage medium, the program of instructions, when executed, configured to:

at least one of (a) store information and (b) access information on at least one of a subscriber identity module and a UMTS subscriber identity module on a universal integrated circuit card connected to or in a mobile communication apparatus which supports MMS services, said subscriber identity module or UMTS subscriber identity module being disconnectable from said mobile communication apparatus, wherein at least one MMS notification is stored and/or accessed in at least one elementary file on said subscriber identity module or UMTS subscriber identity module, wherein a status byte is included in records of the at least one elementary file wherein the status byte comprises information regarding the status of the MMS notification message, the delivery report and/or the multimedia message retrieval, wherein the MMS-related information is stored in at least one file on the at least one of a subscriber identity module and a UMTS subscriber identity module on a universal circuit card, the at least one file being at least one of a plurality of elementary files, dedicated files and a master file; and wherein the status byte is updated when said at least one of a subscriber identity module and a UMTS subscriber identity module on a universal circuit card is connected to an User Agent and said User Agent receives an MMS notification, receives an multimedia message, receives an MMS delivery report and/or receives an MMS read-reply report or originates a multimedia message, allows/disallows the creation of an MMS delivery report and/or originates an MMS read-reply report to be stored on said at least one of a subscriber identity module and a UMTS subscriber identity module on a universal circuit card.

\* \* \* \* \*